(12) United States Patent
Yamanaka et al.

(10) Patent No.: US 7,768,934 B2
(45) Date of Patent: Aug. 3, 2010

(54) COMMUNICATIONS DEVICE, COMMUNICATIONS METHOD, COMMUNICATIONS PROGRAM, STORAGE MEDIUM STORING THE COMMUNICATIONS PROGRAM, AND COMMUNICATIONS SYSTEM

(75) Inventors: Shigeyuki Yamanaka, Tenri (JP); Yoshihiro Ohtani, Kyoto (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1256 days.

(21) Appl. No.: 11/258,953

(22) Filed: Oct. 27, 2005

(65) Prior Publication Data

US 2006/0104370 A1 May 18, 2006

(30) Foreign Application Priority Data

Oct. 29, 2004 (JP) ............................. 2004-316992
Oct. 25, 2005 (JP) ............................. 2005-310030

(51) Int. Cl.
*H04L 12/26* (2006.01)
(52) U.S. Cl. ...................................... 370/252; 370/468
(58) Field of Classification Search ......... 370/229–235, 370/252–253
See application file for complete search history.

(56) References Cited

U.S. PATENT DOCUMENTS

| | | | |
|---|---|---|---|
| 5,544,170 A | | 8/1996 | Kasahara |
| 6,034,971 A | * | 3/2000 | Love et al. .................. 370/468 |
| 6,160,915 A | | 12/2000 | Kato et al. |
| 6,188,700 B1 | | 2/2001 | Kato et al. |
| 6,404,776 B1 | * | 6/2002 | Voois et al. .................. 370/468 |
| 6,504,850 B1 | | 1/2003 | Kato et al. |
| 2002/0053053 A1 | * | 5/2002 | Nagai et al. .................. 714/712 |
| 2002/0136164 A1 | * | 9/2002 | Fukuda et al. ............... 370/230 |
| 2005/0147033 A1 | * | 7/2005 | Chin et al. .................... 370/229 |
| 2006/0007943 A1 | * | 1/2006 | Fellman ....................... 370/400 |

FOREIGN PATENT DOCUMENTS

| | | |
|---|---|---|
| JP | 60-10974 A | 1/1985 |
| JP | 3-267846 A | 11/1991 |
| JP | 7-152668 A | 6/1995 |
| JP | 9-163342 A | 6/1997 |
| JP | 10-190745 A | 7/1998 |
| JP | 11-308373 A | 11/1999 |
| JP | 2000-295597 A | 10/2000 |
| JP | 2002-204278 A | 7/2002 |
| JP | 2004-153610 A | 5/2004 |
| WO | WO-98/32252 A1 | 7/1998 |

OTHER PUBLICATIONS

"Amendment 7: Medium Access Control (Mac) Quality of Service (QoS) Enhancements", IEEE P802.11e/D10.0, (Sep. 2004), pp. (i~vi, 1~6,1~13,78~93).

* cited by examiner

*Primary Examiner*—Ricky Ngo
*Assistant Examiner*—Pao Sinkanitarakorn
(74) *Attorney, Agent, or Firm*—Birch, Stewart, Kolasch & Birch, LLP

(57) ABSTRACT

A transmitting device includes: (i) an encoding rate managing section which controls an encoding rate of an encoding rate altering section which alters the encoding rate; (ii) an error resilience managing section which controls error resilience of an error resilience adding section; and a channel conditions measurement section which measures channel conditions of a communications medium. The encoding rate managing section and the error resilience managing section calculates a transmission capacity of packets in accordance with the channel conditions having been measured by the channel conditions measurement section, and then performs control of encoding rate setting or error resilience setting in accordance with the calculated transmission capacity.

36 Claims, 15 Drawing Sheets

FIG. 7

| TM | 1 | 2 | 3 |
|---|---|---|---|
| PHY RATE | 36Mbps | 24Mbps | 12Mbps |
| Rmax[TM] | 9Mbps | 6Mbps | 3Mbps |

FIG. 10

| PHY RATE | MODULATION SCHEME | ENCODING RATIO | ERROR RESILIENCE |
|---|---|---|---|
| 6Mbps | BPSK | 1/2 | HIGH ↑<br><br>↓ LOW |
| 9Mbps | BPSK | 3/4 | |
| 12Mbps | QPSK | 1/2 | |
| 18Mbps | QPSK | 3/4 | |
| 24Mbps | 16QAM | 1/2 | |
| 36Mbps | 16QAM | 3/4 | |
| 48Mbps | 64QAM | 2/3 | |
| 54Mbps | 64QAM | 3/4 | |

COMMUNICATIONS DEVICE, COMMUNICATIONS METHOD, COMMUNICATIONS PROGRAM, STORAGE MEDIUM STORING THE COMMUNICATIONS PROGRAM, AND COMMUNICATIONS SYSTEM

This Nonprovisional application claims priority under 35 U.S.C. §119(a) on Patent Application No. 316992/2004 filed in Japan on Oct. 29, 2004, and Patent Application No. 310030/2005 filed in Japan on Oct. 25, 2005, the entire contents of which are hereby incorporated by reference.

FIELD OF THE INVENTION

The present invention relates to (i) a communications device, (ii) a communications method, (iii) a communications program, (iv) a storage medium storing the communications program, and (v) a communications system, all of which performs transmission of stream data and the like via a communications channel that varies its channel conditions in wireless communications, for example.

BACKGROUND OF THE INVENTION

In recent years, as accompanied with development of a communication technology, a wireless communications system using wireless communications is utilized so as to eliminate bothersome wiring for constructing a LAN (Local Area Network) and so as to attain communication connection between (i) an AV source, such as a tuner, and (ii) an AV playback device, such as a display, both of which are provided at a distance from each other.

Meanwhile, proposed as one means of attaining Internet connection is the use of a power line communications system utilizing an existing power line. Such a power line communication is a promising next generation communications system.

However, the wireless communications system suffers from such a problem that: the longer a transmission distance becomes in the wireless communications, the more easily the wireless communications system is influenced by multi-path phasing. On the other hand, the power line communications system is susceptible to noise generated from a home electric appliance. These problems apt to cause data loss in a case where real-time stream data such as video are transmitted under deteriorated communications environment, resulting in the occurrence of video disturbance. Accordingly, a user cannot enjoy viewing the stream data comfortably. Required for solving such a problem in each of the wireless communications system and the power line communications system is control for securing the QoS (Quality of Service) indicated by a transmission error rate, jitter (delay information), and the like.

One method for restraining such video disturbance is a video rate control technique by which a compression ratio of video to be transmitted is changed according to dynamically changing communications environment. The video rate control technique is a method for adjusting an amount of data to be actually transmitted. The adjustment is carried out in the following manner. When the communications environment deteriorates, the stream data to be transmitted is encoded at a high compression ratio (at a low encoding rate). On the other hand, when the communications environment becomes good, the stream data to be transmitted is encoded at a low compression ratio (at a high encoding rate).

The video rate control technique has (i) a translation technique of re-encoding stream data which has been already encoded at arbitrary compression ratio at another compression ratio and (ii) an encoding technique of encoding analogue-inputted stream data at arbitrary compression ratio.

The "deterioration of the communications environment" indicates such a state that an effective bandwidth of a transmission channel is narrow. As such, under deteriorated communications environment, reduction of the amount of data to be transmitted alleviates the video disturbance.

A specific example of a publicly known technique using such a video rate control technique is a communications control method disclosed in Patent document 1 which will be described later. The communications control method uses the RTP (Real-time Transport Protocol) and the RTCP (RTP Control Protocol), and is such a method as follows. That is, a receiving station measures the jitter and the packet loss rate, and transmits, to a transmitting station, information indicative of the jitter and the packet loss rate. The transmitting station thus receiving the information predicts the transmission channel conditions so as to adjust the bit rate of the data to be transmitted.

Further, later-described Patent document 2 discloses another communications control method. The communications control method is carried out in the following manner. That is, a receiving station measures a reception level so as to calculate a required transmission rate. The receiving station carries out this operation with respect to the n-number of samples so as to find an average value of the required transmission rate. Then, the receiving station gives a contents rate change instruction to the transmitting station in accordance with a past record. The transmitting station alters contents rate in accordance with the contents rate change instruction.

As such, each of Patent documents 1 and 2 discloses the technique for adjusting the rate of the stream data so as to restrain the video disturbance even when the effective bandwidth of the transmission channel is narrowed. Meanwhile, there are further alternative methods (1) and (2) for restraining such video disturbance: (1) a control method of securing a stable transmission channel, and (2) a control method of increasing the effective bandwidth that was narrowed due to the deterioration of the transmission channel conditions.

A specific example of a wireless LAN specification taking the QoS into account is the IEEE 802.11 specification specified by the TGe (Task Group E) (hereinafter, referred to as "IEEE 802.11e"). See Non-patent document 1.

The IEEE 802.11e employs (i) a distribution communication control method "EDCA (Enhanced Distributed Channel Access)", and (ii) a central communication control method "HCCA (Hybrid Coordinator Function Controlled Channel Access)". The communications control carried out in accordance with the EDCA method allows communication stations to be granted a transmission right at a priority-based probability. On the other hand, the communication control carried out in accordance with the HCCA method allows the communication stations to be accessible to the communication channel under control of an HC (Hybrid Coordinator). It is preferable to secure the bandwidth by communications control of the HCAA, in transmitting the stream data. In cases where the bandwidth is managed by the HC as such, a certain communication bandwidth is securely allocated to the transmitting station for a predetermined time period. This allows for stable transmissions.

However, even when the bandwidth is secured in accordance with the HCCA method, an error can occur frequently in wireless communications due to (i) the hidden node problem occurring in cases where the communication stations are too distant away from each other to communicate with each other; and (ii) limitation in a communication distance. In this case, such a transmission error can be reduced by altering error resilience to a higher one in the data transmission. This makes it possible to increase the effective bandwidth.

Examples of means for altering the error resilience include: (i) a method of applying, to the transmission data, an error correcting code (FEC) such as a Read Solomon code or a turbo code; (ii) a method of changing types of transmission rate in a physical layer (hereinafter, referred to as "PHY rate"). For example, in the IEEE802.11a that is a wireless LAN standard, the PHY rate is determined according to a combination of (i) a modulation scheme such as the BPSK, the QPSK, and the QAM, and (ii) a convolution encoding ratio.

However, strengthening the error resilience and increasing the communications bandwidth are in a trade-off relation. In other words, the communications bandwidth decreases when the error resilience is strengthened under good channel conditions.

(Patent Document 1)

Japanese Unexamined Patent Publication No. 204278/2002 (Tokukai 2002-204278; published on Jul. 19, 2002)

(Patent Document 2)

Japanese Unexamined Patent Publication No. 153610/2004 (Tokukai 2004-153610; published on May 27, 2004)

(Non-Patent Document 1)

IEEE STD 802.11e Draft10.0 September 2004

According to the method disclosed in each of Patent documents 1 and 2, the receiving station predicts the conditions of the band in accordance with (i) information on the jitter and the packet loss rate or (ii) the reception level. The receiving station gives, to the transmitting station, feedback with specially created packets including the information, and the transmitting section carries out the video rate control. This allows for high-quality video transmission. However, in this method, the receiving station gives, to the transmitting station, the feedback about the information on channel conditions measured by the receiving station. This causes delay until the transmitting station performs the video rate control after receipt of the feedback information. Therefore, in a case when the conditions of communications channel rapidly change due to an environmental change such as passage of obstacles including human beings and devices through the channel, there could occur a delay in tracking with the video rate control with respect to the deterioration of communications environment. In addition, there could occur such a state that the transmitting station is unable to grasp the communications environment because the feedback information itself does not reach the transmitting station due to the deterioration of communications environment.

Further, it is not easy for the transmitting station to predict the conditions of the band in accordance with (i) the jitter and packet loss rate measured by the receiving station or (ii) the reception level. Specifically, under deteriorated communications environment, it is easy to predict how much amount of data should be reduced from the amount of currently transmitting data in accordance with the proportion of the amount of data successfully received by the receiving station to the amount of data transmitted by the transmitting station. In other words, it is easy to predict how much the current video rate should be decreased.

However, in a case where the communications environment recovers and the amount of data transmitted by the transmitting station becomes equal to the amount of data successfully received by the receiving station, it is not easy to predict how much amount of data should be increased from the amount of currently transmitting data, i.e. how much the current video rate should be decreased. In this case, a technique of increasing the rate little by little in reference to a table or the like is generally adopted. Such a technique causes the problem of a delay in tracking with the video rate control.

This requires the receiving station to have (i) a mechanism which measures the channel conditions, and (ii) a mechanism which gives, to the transmitting station, the feedback about the channel conditions. Accordingly, a circuit structure of the receiving station becomes complex. This causes cost increase in the receiving station.

In the meanwhile, the HCCA communication control disclosed in Non-patent document 1 is effectively used to secure a stable communication bandwidth. Moreover, when an error occurs frequently due to the hidden node problem and/or the limitation in the communication, distance, the communication control by the HCCA is carried out more strictly, and the error resilience in the data transmission is strengthened, with the result that the effective bandwidth can be increased. However, as disclosed in each of Patent documents 1 and 2, a present technique of controlling the error resilience is generally the technique of controlling the error resilience in response to the feedback given from the receiving station to the transmitting station about the information on (i) the jitter and packet loss rate or (ii) the reception level, each of which is measured by the receiving station. Therefore, as is the case with the video rate control operation, it is not easy to predict the extent to which the error resilience can be lowered when the communications environment becomes good.

Further, at present, only a few communications devices adopt the HCCA communication control to secure the bandwidth for transmission. Predominant are communications devices performing communications without securing the communications bandwidth. For this reason, control needs to be performed in view of not only (i) the communications with a bandwidth secured under the HCCA communication control, but also (ii) the communications by the EDCA or the like, described in the IEEE802.11e, where a communications right is granted at a priority-based probability.

Further, the control in each of the aforementioned conventional methods is carried out in such a manner that the receiving station predicts the conditions of the band, and the transmitting station performs controls, tracking the change of the predicted conditions of the band. However, the radio channel is such a medium that the bandwidth is changed rapidly, so that it is not always expedient that the encoding rate (video rate) is altered according to the change of the bandwidth of the radio channel. For example, see the case where the encoding rate is drastically slowed down according to a sudden deterioration of the band of the radio channel. Such sudden slowing-down causes apparent video image deterioration. However, the deterioration in the radio channel is likely to be recovered to the original state after a certain time passes. For example, in cases where there is a relatively long time limit within which the stream data must be reproduced at a receiving station (valid period of the stream data), good control can be possibly carried out after observing for a while whether or not the conditions of the radio channel are recovered to the original state. In contrast, in cases where there is a short time limit within which the transmitted stream data must be reproduced at a receiving station (valid period of the stream data), the video image deterioration possibly occurs when the encoding rate is not drastically slowed down according to the deterioration of the radio channel.

SUMMARY OF THE INVENTION

The present invention is made in light of the aforementioned problems, and its object is to provide (i) a communications device that needs no feedback information specially created by the receiving station when transmitting real-time stream data under various channel conditions and communication settings, and that alleviates the communications disturbance by applying, to the transmitting station, (a) the video rate control (i.e. encoding rate setting control) and/or (b) the error resilience control allowing high reaction speed with respect to the variation of the communications environment; (ii) a communications method; (iii) a communications program; (iv) a storage medium storing the communications program; and (v) a communications system.

In order to solve the above problem, the communications device of the present invention is a communications device which transmits stream data to an external communications device via a communications medium through packet communications, the communications device comprising: an encoding rate altering section which alters an encoding rate of the stream data; and an encoding rate managing section which controls alteration of the encoding rate, the encoding rate managing section including an encoding rate determining section which determines the encoding rate in accordance with information on valid period of the stream data.

In order to solve the above problem, the communications method of the present invention is a communications method for transmitting stream data to an external communications device via a communications medium through packet communications, the communications method comprising: an encoding rate, altering step of altering an encoding rate of the stream data; and an encoding rate managing step of controlling alteration of the encoding rate, wherein: in the encoding rate managing step, the encoding rate is determined in accordance with information on valid period of the stream data.

Here, the "valid period of the stream data" is a time limit within which the stream data transmitted from the communications device at a transmitting end must be reproduced at a receiving station.

In the above arrangement and method, the transmitting station has the information on valid period of the stream data, so that it is possible to change a behavior for the encoding rate control according to the valid period of the stream data in the following manners: If the valid period is relatively long, the transmitting station-performs controls after observing the conditions of a radio channel for a while. In contrast, if the valid period is relatively short, the encoding rate is rapidly decreased with degradation of the wireless channel.

Further, in order to solve the above problem, the communications device of the present invention is a communications device which transmits stream data to an external communications device via a communications medium through packet communications, the communications device comprising: an encoding rate altering section which alters an encoding rate of the stream data; and an encoding rate managing section which controls alteration of the encoding rate, the encoding rate managing section including an encoding rate determining section which determines the encoding rate in accordance with information on delay time until the encoding rate altering section actually alters the encoding rate after the encoding rate determining section instructs the encoding rate altering section to alter the encoding rate.

Still further, the communications method of the present invention is a communications method for transmitting stream data to an external communications device via a communications medium through packet communications, the communications method comprising: an encoding rate altering step of altering an encoding rate of the stream data; and an encoding rate managing step of controlling alteration of the encoding rate, wherein: in the encoding rate managing step, the encoding rate is determined in accordance with information on delay time until the encoding rate is actually altered in the encoding rate altering step after a receipt of encoding rate alteration instruction in the encoding rate altering step.

Here, the encoding rate altering section requires some delay time until it actually alters the encoding rate after a receipt of the encoding rate alteration instruction, and must perform encoding while maintaining the encoding rate which has already been set for a given period after a receipt of the encoding rate alteration instruction. The "delay time until the encoding rate is actually altered in the encoding rate altering step after a receipt of encoding rate alteration instruction in the encoding rate altering step" is a time found in view of a period during which the encoding rate altering section cannot alter the encoding rate.

In the above arrangement and the method, in the encoding rate altering step, the transmitting station grasps a maximum delay time until the encoding rate is actually altered in the encoding rate altering step after a receipt of encoding rate alteration instruction. Therefore, considering at all times that the encoding rate is not altered during the maximum delay time, it is possible to perform an appropriate encoding rate control even when the encoding rate is not actually altered during the delay time.

In order to solve the above problem, the communications device of the present invention is a communications device which performs packet communications to an external communications device via a communications medium, the communications device comprising: a channel conditions measurement section which measures channel conditions in the communications medium; an error resilience adding section which adds error resilience to packets to be transmitted; and an error resilience managing section which controls the error resilience added by the error resilience adding section, wherein: the error resilience managing section calculates a packet error rate of packets transmitted in a predetermined time period in accordance with the channel conditions having been measured by the channel conditions measurement section, and performs controls so as to (i) alter the error resilience to a higher error resilience if the packet error rate is not less than a threshold value and to (ii) lower the error resilience regardless of the channel conditions having been measured by the channel conditions measurement section if a predetermined time period has elapsed without alteration of the error resilience.

In order to solve the above problem, the communications method of the present invention is a communications method for performing packet communications with respect to an external communications device via a communications medium, the communications method comprising: a channel conditions measurement step of measuring channel conditions in the communications medium; an error resilience adding step of adding error resilience to packets to be transmitted; and an error resilience managing step of controlling the error resilience added in the error resilience adding step, wherein: in the error resilience managing step, a packet error rate of packets transmitted in a predetermined time period is calculated in accordance with the channel conditions having been measured in the channel conditions measurement step, and controls are performed in such a manner that (i) the error resilience is altered to a higher error-resilience if the packet error rate is not less than a threshold value and that (ii) the error resilience is lowered regardless of the channel conditions having been measured in the channel conditions measurement step if a predetermined time period has elapsed without alteration of the error resilience.

In the above arrangement and method, a packet error rate of packets transmitted in a predetermined time period is calculated in accordance with the channel conditions having been measured by the channel conditions measurement section. Here, the packet error rate is the ratio of the sum of (a) the number of packets for which acknowledgements with reception error information have been returned and (b) the number of packets for which acknowledgements have not been returned, with respect to the total number of transmitted packets. Therefore, if the packet error rate increases, it is predicted that the channel conditions is deteriorated. In the above arrangement and method, if the calculated packet error rate is not less than a threshold value, controls are performed to alter the error resilience to a higher one. On the other hand, if a predetermined time period has elapsed without alteration of the error resilience, controls are performed to lower the error resilience regardless of the channel conditions.

Thus, according to the above arrangement and method, the error resilience control is performed in accordance with the channel conditions having been measured by the communications device at the transmitting end. This eliminates the need for feedback information specially created by the communications device at a receiving end, and thus allows for promptly tracking variation of the communications environment. By performing control for higher error resilience by using increase in packet error rate as an index indicating deterioration of the channel conditions, it is possible to perform the control with the current channel conditions grasped accurately. Further, by performing control for lower error resilience regardless of the channel conditions if a predetermined time period has elapsed without alteration of the error resilience, a prompt tracking with respect to the recovery of the channel conditions is possible.

Further, in order to solve the above problem, the communications device of the present invention is a communications device which transmits stream data to an external receiving device via a plurality of relay stations through packet communications, the communications device comprising: an encoding rate altering section which alters an encoding rate of the stream data; and an encoding rate managing section which controls alteration of the encoding rate, wherein: the encoding rate managing section compares between a total amount of data transmitted from said communications device and a total amount of data received by the receiving device so as to predict amounts of data stored in the transmission buffer of said communications device and transmission buffers of the respective relay stations, and determines the encoding rate in accordance with the predicted amounts of stored data and the total amount of data received by the receiving device.

In order to solve the above problem, the communications method of the present invention is a communications method for transmitting stream data from a communications device to an external receiving device via a plurality of relay stations through packet communications, the communications method comprising: an encoding rate altering step of altering an encoding rate of the stream data; and an encoding rate managing step of controlling alteration of the encoding rate, wherein: in the encoding rate managing step, comparison is performed between a total amount of data transmitted from the communications device and a total amount of data received by the receiving device so as to predict amounts of data stored in the transmission buffer of said communications device and transmission buffers of the respective relay stations, and the encoding rate is determined in accordance with the predicted amounts of stored data and the total amount of data received by the receiving device.

According to the above arrangement and method, the encoding rate control of the present invention becomes applicable to the Internet and mobile phone networks which include multiple relay stations between the communications device and the receiving device. Further, none of the receiving device and the relay stations needs to be equipped with a mechanism which creates special feedback information for the adjustment of the encoding rate.

Note that, the communications control of the communications device may be realized by a computer. In such an arrangement, the present invention includes a computer-readable storage medium storing a program which causes the computer to realize the foregoing communications device by causing the computer to operate as the foregoing sections.

Further, a communications system of the present invention includes: any of the foregoing communications device; and a receiving device which is capable of communications with said communications device via a communications medium, and receives stream data from said communications device.

This makes it possible to construct a communications system in which an appropriate data transmission is performed according to the channel conditions in the communications medium.

Thus, the present invention enables (i) the need of no feedback information specially created by the receiving station and (ii) the encoding rate control and the error resilience control each of which allows high reaction speed with respect to the variation of the communications environment at the transmitting station. Therefore, the present invention can be used effectively in a communications system where real-time data such as video data are transmitted and received.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7 is a table, which is stored in a table memory section of the transmitting device illustrated in FIG. 3, showing a relation between a PHY rate and a maximum transmission capacity.

FIG. 10 is a table showing a relation between PHY rate and error resilience.

FIG. 14 is a functional block diagram illustrating the internal configuration of the encoding rate managing section in a case where a table memory section is not referred to.

DESCRIPTION OF THE EMBODIMENTS

The following will explain an embodiment of the present invention with reference to FIGS. 1 through 14. The present embodiment will describe, as examples, (i) a transmitting device (communication device) which requires no special feedback information created by a receiving station in alleviating video disturbance by a transmitting station adopting the encoding rate control and the error resilience control each of which allows high reaction speed with respect to variation of a communication environment and (ii) a communications system including the transmitting device.

Figure 2:
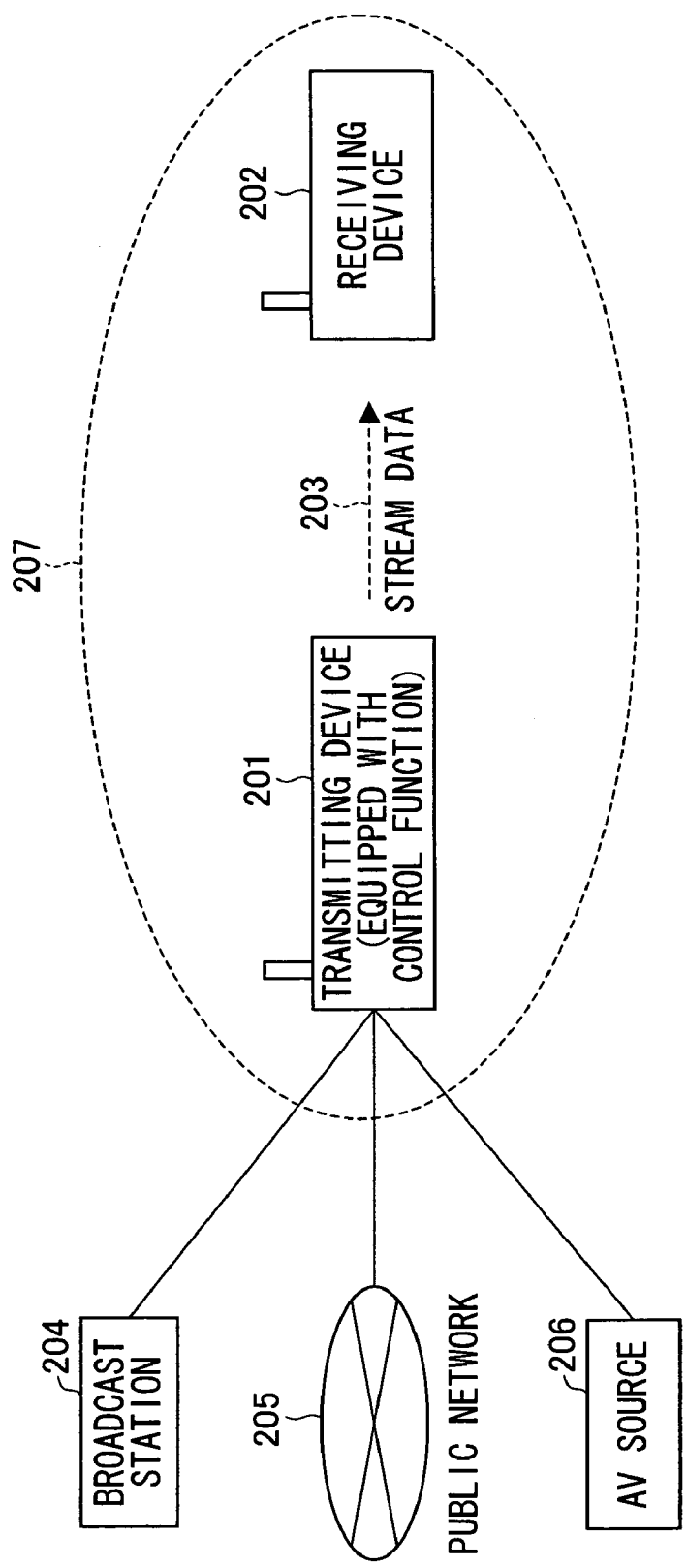
FIG. 2 is a diagram schematically illustrating a configuration of a communications system according to one embodiment of the present invention.

First, a configuration of the communications system according to the present embodiment is described. FIG. 2 is a diagram schematically illustrating an example of the communications system according to the present embodiment. As illustrated in FIG. 2, a network system 207 included in the communication network includes a transmitting device (communication device) 201 and a receiving device 202. The transmitting device 201 and the receiving device 202 are in communication/connection with each other via a communications medium 203.

The transmitting device 201 has a communication management function and a data transmission function for transmitting stream data of video, voice, and the like, required to be transmitted in realtime, while carrying out the encoding rate control and/or the error resilience control. The receiving device 202 receives the stream data.

The communication management function of the transmitting device 201 means HCCA and EDCA communication control based on HC defined in 802.11e. Hereinafter, the communication management function is referred to as an HC function. FIG. 2 illustrates an example where a single device has the HC function and the data transmission function, but these functions may be respectively realized by different devices. That is, a communication control device having the HC function and a transmitting device having the data transmission function may be respectively provided.

Further, for ease of description, FIG. 2 illustrates an example where the network system 207 is provided with the transmitting device 201 and the receiving device 202, but the network system 207 may be provided with plural transmitting devices and plural receiving devices. Further, the transmitting device and the receiving device are separately illustrated, but the transmitting device may function also as the receiving device or the receiving device may function as the transmitting device.

The communications medium 203 is not particularly limited: various communications media can be used as the communications medium 203. An example of the communications medium 203 is a radio communications medium adopting 802.11a which is a 5 GHz band radio standard. When the radio communications medium is used, it is possible to realize a network system which allows radio communications of devices as a home LAN for example. In this example, the arrangement is made on the assumption that the transmitting device 201 functions as a home server such as STB (Set Top Box) for managing all radio communications devices and a video source in home. It is assumed that the transmitting device 201 serving as the home server has a function for receiving video and voice stream data from a broadcast station 204 such as a BS/CS broadcast station, a ground wave broadcast station, etc. or a public network 205 such as the Internet. Further, it is assumed that the receiving device 202 has a display function and a voice outputting function as a television for example. According to this system, it is possible to realize a specific example arranged so that the transmitting device 201 serving as a home server carries out the encoding rate control and/or the error resilience control while checking channel conditions so as to transmit the externally inputted stream data to the receiving device 202 serving as a television.

Note that, in the foregoing example, it is assumed that digital data is inputted to the transmitting device 201 serving as a home server. However, it can be so arranged that analog data is inputted from the AV source 206 serving as a media player such as a DVD (Digital Versatile Discs) player, a BD (Blue-Ray Discs) player, and a video player. In this case, the transmitting device 201 serving as a home server has a function for carrying out an encoding process such as MPEG encoder, thereby realizing the foregoing arrangement. Further, it may be so arranged that the media player per se includes the transmitting device 201 therein.

Further, the foregoing example described the 5 GHz band radio communications medium as an example of the communications medium 203. However, it is possible to use a 2.4 GHz band radio communications medium, a millimetric-wave band radio communications medium, and a communications medium using a power line.

Here, a brief description is given concerning how transmission/reception of the stream data is carried out in the network system 207. First, negotiation is carried out between the transmitting device 201 and the receiving device 202 as to information regarding the stream data QoS; i.e., jitter information, information regarding a size of a buffer to be prepared, an amount of data to be transmitted, and a valid period of the stream data. Further, in consideration for a result of the negotiation and information regarding whether the transmission is based on HCCA or EDCA, it is determined whether the HC function of the transmitting device 201 can secure a communications band or not. In a state where a communications band can be secured, transmission of stream data is permitted by the HC function. In case where data transmission is carried out on the basis of the HCCA communication control, a band for the data transmission is allocated by the HC function, and the transmitting device 201 practically starts transmission of the stream data during TXOP corresponding to the allocated band. Further, in case where the data transmission is carried out on the basis of the EDCA communication control, the transmitting device 201 starts transmission of the stream data with best effort.

Figure 3:
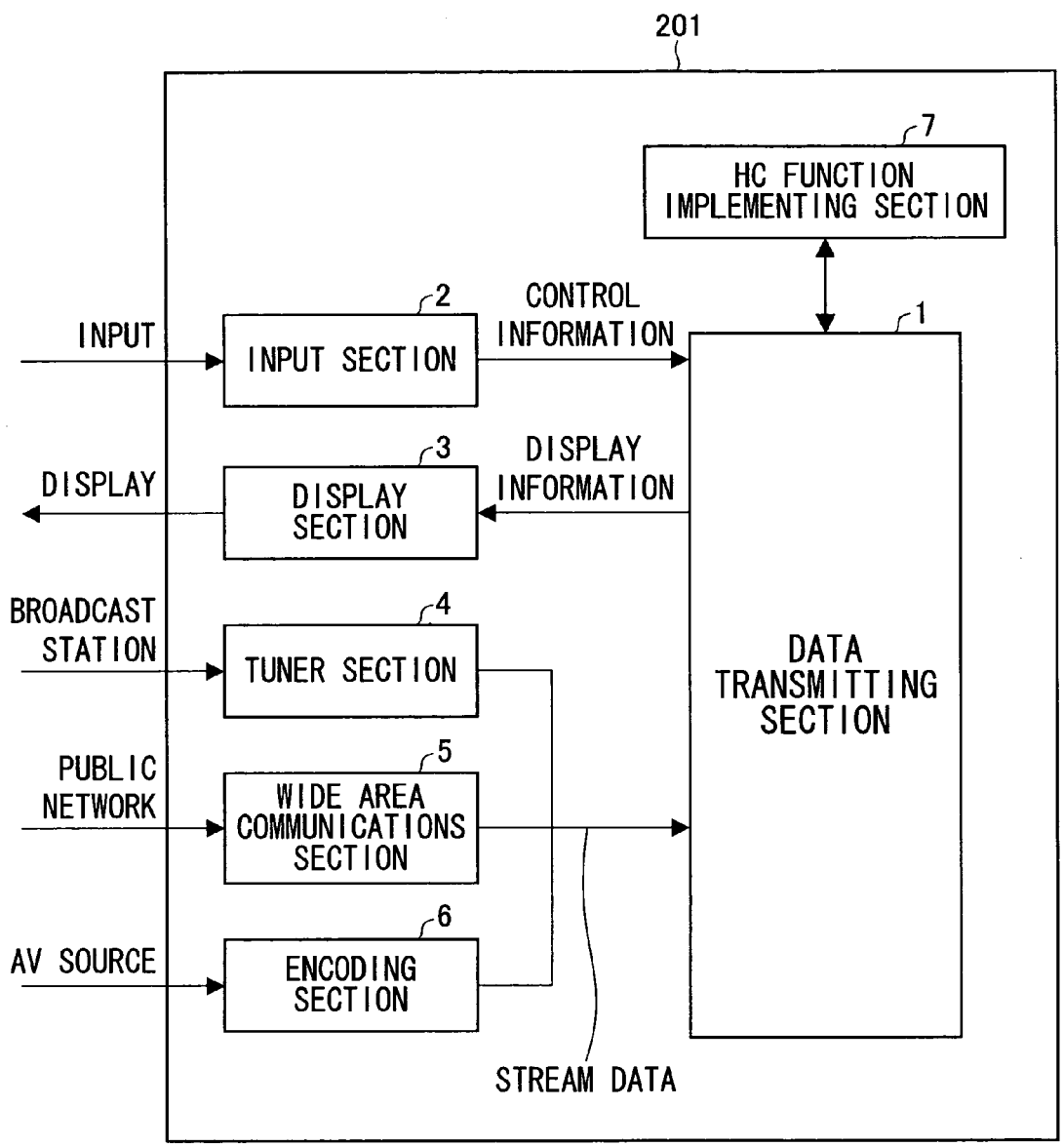
FIG. 3 is a block diagram illustrating a structure of a transmitting device according to one embodiment of the present invention.

Next, a transmitting device according to the present embodiment (that is, the transmitting device 201) is described as follows with reference to FIG. 3. FIG. 3 illustrates an exemplary structure of the transmitting device 201. As illustrated in FIG. 3, the transmitting device 201 includes a data transmitting section 1, an input section 2, a display section 3, a tuner section 4, a wide area communications section 5, an encoding section 6, and an HC function implementing section 7.

The input section 2 allows a user to input an instruction to the transmitting device 201. The input section 2 is constituted of various buttons provided on the transmitting device 201 for example.

The display section 3 displays operation conditions or the like of the transmitting device 201. The display section 3 is constituted of various indicator lamps, a liquid crystal display device, or the like for example.

The tuner section 4 receives digital broadcast such as BS/CS broadcast, ground wave digital broadcast, etc., which are transmitted from the broadcast station 204. The wide area communications section 5 receives contents data from the public network 205 such as the Internet or the like. The wide area communications section 5 is constituted of a modem or the like for example. The encoding section 6 receives analog data serving as AV source from the analog AV source 206 and carries out an encoding process for converting the received analog data into digital data such as MPEG 2.

The HC function implementing section 7 is a block for realizing the HC function. That is, in case where transmission/reception of data is carried out between the transmitting device 201 and the receiving device 202 on the basis of the HCCA communication control, the HC function implementing section 7 carries out the band allocation for transmitting data. Here, on the basis of negotiation carried out between the transmitting device 201 and the receiving device 202 as to information regarding stream data QoS, i.e., jitter information, information regarding a size of a buffer to be prepared, an amount of data to be transmitted, and a valid period of the stream data, the HC function implementing section 7 carries out the band allocation. Note that, in case where transmission/reception of data between the transmitting device 201 and the receiving device 202 is carried out exclusively by the EDCA, it is not necessary to provide the HC function implementing section 7.

The data transmitting section 1 transfers the stream data, transmitted from the tuner section 4, the wide area communications section 5, and the encoding section 6, to the receiving device 202 via the communications medium 203. In this transfer process, the data transmitting section 1 carries out the encoding rate control and/or the error resilience control according to channel conditions at this time. The encoding rate control and the error resilience control that are carried out in the data transmitting section 1 will be detailed later.

Note that, while the HCCA communication control is being carried out by the HC function implementing section 7, the data transmitting section 1 transmits data within a range of the band allocated by the HC function implementing section 7.

Further, the data transmitting section 1 causes the display section 3 to display a current set-up condition of a communication mode and channel conditions, and receives control information transmitted from the input section 2 on the basis of an input indicative of the user's instruction to change the set-up of the communication mode. Examples of the communication mode which can be set by the user are a high quality mode and a low power consumption mode. The high quality mode is a mode in which higher quality of stream data is prioritized over lower power consumption. The low power consumption mode is a mode in which lower power consumption is prioritized over higher quality of stream data. In accordance with current set-up of the communication mode and channel conditions that are informed by the data transmitting section 1, the display section 2 displays the information to the user.

Figure 1:
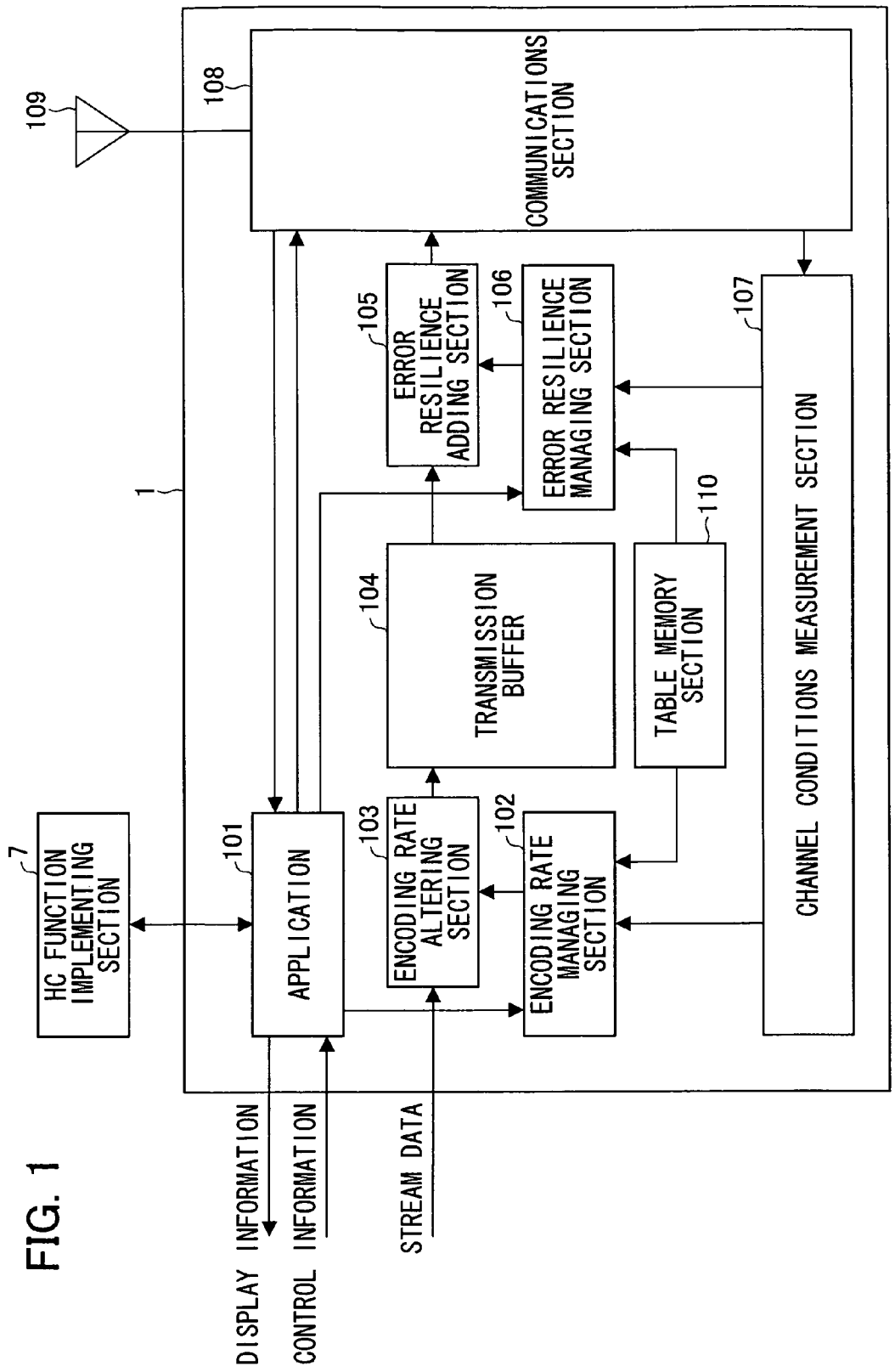
FIG. 1 is a block diagram illustrating the structure of a data transmitting section of a transmitting device illustrated in FIG. 3.

Referring to the functional block diagram of FIG. 1, the following will describe a structure of the data transmitting section 1. As illustrated in FIG. 1, the data transmitting section 1 includes an application 101, an encoding rate managing section 102, an encoding rate altering section 103, a channel conditions measurement section 107, a transmission buffer 105, an error resilience managing section 106, an error resilience adding section 107, a communications section 108, an antenna 109, and a table memory section 110.

The application 101 performs the process of notifying the display section 3 of various channel conditions including, for example, information concerning current settings of the communications mode, information concerning the encoding rate managed by the encoding rate managing section 102, and information concerning the error resilience managed by the error resilience managing section 106. Further, based on the settings of the communications mode, the application 101 alters the settings of the encoding rate managing section 102 concerning the type of transmission rate and the maximum of transmission power for the physical layer currently in use. Here, the communications mode may be set according to instructions entered through the input section 2, or instructions sent from an external device, for example, such as the receiving device 202, via the communications section 108. Further, under the control communicated from the HC function implementing section 7, the application 101 controls the communications process performed by the communications section 108.

The encoding rate managing section 102 controls the encoding rate settings of the encoding rate altering section 103 within a range of the maximum and minimum values of encoding rate set by the application 101. This is performed according to the current channel conditions in the communications medium 203 as measured by the channel conditions measurement section 107. As to details of controlling the encoding rate settings, a further explanation will be given later.

The encoding rate altering section 103 performs a video rate control process according to the encoding rate set by the encoding rate managing section 102. Specifically, the encoding rate altering section 103 receives stream data from at least one of the tuner section 4, the wide area communications section 5, and the encoding section 6, and alters the encoding rate of the stream data according to the preset encoding rate.

Further, the encoding rate altering section 103 may be arranged in such a manner that in a case where the transmitting device 201 has a plurality of content items, in advance, that are of the same content but are different in encoding rate from one another, the encoding rate altering section 103 selects content items whose encoding rate is nearest to the encoding rate set by the encoding rate managing section 102.

The transmission buffer 104 converts the stream data with its encoding rate altered or selected by the encoding rate altering section 103 into packets and temporarily stores the thus converted packets. The transmission buffer 104 is realized by a high-speed rewritable storage medium, for example, such as RAM.

The error resilience managing section 106 controls the error resilience settings of the error resilience adding section 105 at the transmission rate and within the maximum range of transmission power set for the physical layer by the application 101. This is performed according to the current channel conditions in the communications medium 203 as measured by the channel conditions measurement section 107. As to details of controlling error resilience, a further explanation will be given later.

The error resilience adding section 105 performs the process of adding error resilience according to the error resilience settings set by the error resilience managing section 106. Specifically, the error resilience adding section 105 reads out the packets temporarily stored in the transmission buffer 104, and, after adding error resilience, transmits the packets to the communications section 108.

By the communications section 108, the packets with the error resilience added by the error resilience adding section 105 are transmitted to the receiving section 202 via the communications medium 203. Then, if the communications section 108 finds an error in the transmitted packets upon receiving acknowledgement from the receiving device 202, the communications section 108 instructs the transmission buffer 104 to retransmit the packets, corresponding to the error packets, from among the transmitted packets temporarily stored in the transmission buffer 104. Further, the communications section 108 performs the process of exchanging control information, such as commands entered through the application 101, with the receiving device 202. In this way, the control information sent from the receiving device 202 can be forwarded to the application 101.

From the communications section 108, the channel conditions measurement section 107 acquires receipt status of packet acknowledgement from the receiving device 202, and calculates a packet error rate (PER) based on information of the receipt status.

Instead of calculating the packet error rate, the number of successfully transmitted packets and the number of unsuccessfully transmitted packets may be counted. The channel conditions measuring section 107 performs the process of monitoring information such as the information of a current PHY rate (physical layer communications speed).

The table memory section 110 stores a table (see FIG. 7) representing a relationship between the PHY rate and a maximum transmission capacity at the PHY rate. Details of the table will be described later. The table memory section 110 is realized by, for example, a non-volatile storage medium such as ROM.

Figure 4:
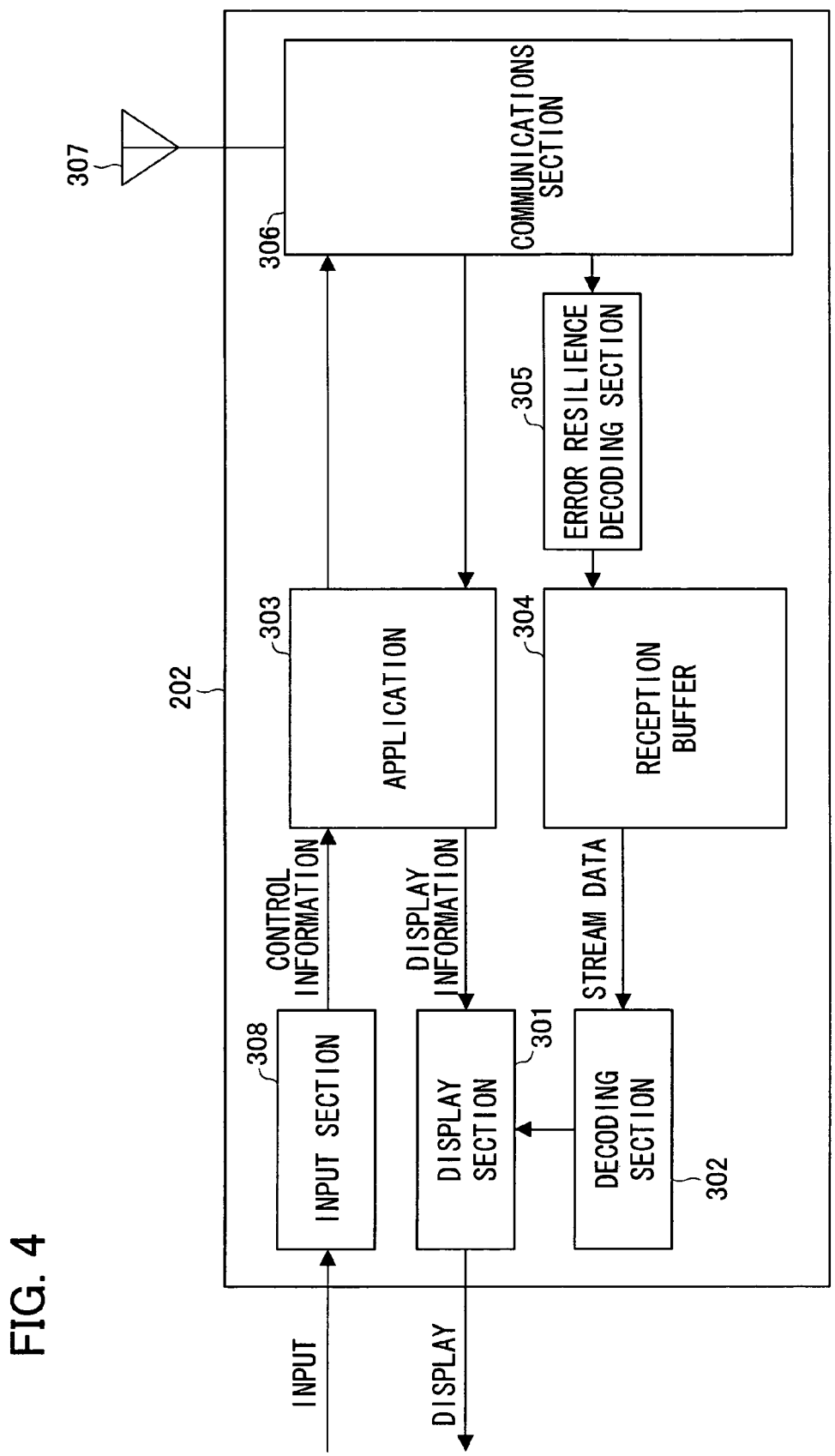
FIG. 4 is a block diagram illustrating a structure of a receiving device which is a component of the communications system illustrated in FIG. 2.

Referring to FIG. 4, the following will describe the receiving device 202. FIG. 4 illustrates an exemplary structure of the receiving device 202. As shown in FIG. 4, the receiving device 202 includes a display section 301, a decoding section 302, an application 303, a reception buffer 304, an error resilience decoding section 305, a communications section 306, an antenna 307, and an input section 308.

The input section 308 is provided to receive user instructions for the receiving device 202. The input section 308 is realized, for example, by various buttons provided in the receiving device 202.

The display section 301 performs the process of displaying information concerning current communications settings and channel conditions notified by the application 303, and stream data decoded by the decoding section 302. The display section 301 is realized by a display device capable of displaying a video image. Examples of such a display device include a liquid crystal display, a plasma display, and a CRT (cathode ray tube).

The decoding section 302 performs the process of decoding stream data stored in the reception buffer 304.

The application 303 performs the process of receiving control information which the input section 308 has sent based on user instructions for changing the settings of the communications mode, and transmitting the control information to the transmitting device 201 via the communications section 306. Here, the settings of the communications mode may be made according to instructions entered through the input section 308, or instructions sent from an external device, for example, such as the transmitting device 201, via the communications section 306. Further, under the control of the application 303, the display section 301 displays current communications settings and channel conditions.

The reception buffer 304 is provided to temporarily store packets sent from the error resilience decoding section 305. At a required timing of the decoding section 302, the reception buffer 304 outputs the stored packets as stream data to the decoding section 302.

The error resilience decoding section 305 receives packets sent from the communications section 306, and decodes the error resilience added by the transmitting device 201. The packets decoded by the error resilience decoding section 305 are sent to the reception buffer 304.

The communications section 306 receives the packets sent from the transmitting device 201. If the communications section 306 finds an error in the received packets, the communications section 306 refers to acknowledgement and requests the transmitting device 201 to retransmit the packets. The communications section 306 performs the process of exchanging control information, such as commands entered through the application 303, with the transmitting device 201. In this way, the control information sent from the transmitting device 201 can be forwarded to the application 303.

Note that the HC function implementing section 7 here secures a bandwidth by HCCA so that stream data can be transmitted at a maximum rate of 9 Mbps when the transmission rate (PHY rate) of the physical layer is 36 Mbps. In addition, the minimum encoding rate by the aforementioned application 101 is set to 1 Mbps.

The maximum encoding rate should ideally be set to the obtained bandwidth less 10% for retransmission, which leaves about 8.1 Mbps. In the present embodiment, however, the maximum rate is set to 9 Mbps for convenience. The transmission buffer 104 in the transmitting device 201 and the reception buffer 304 in the receiving device 202 can buffer Tdb(s) of stream data. Therefore, the time limit within which the stream data must be reproduced at a receiving station (valid period of the stream data) is Tdb(s). The information on the valid period of the stream data is not determined solely by the capacity of the transmission buffer 104 because different devices at the receiving end have different buffering capacity. The information is therefore variable depending on the reception buffer 304. Accordingly, the transmitting device 201 receives the information via the HC function implementing section 7 as information on the QoS of the stream data exchanged between the transmitting device 201 and the receiving device 202.

In the transmission of stream data from the transmitting device 201 to the receiving device 202, the data transmission becomes meaningless if the data does not reach the decoding section 302 in the receiving device 202 on time (reproduction time). It is therefore important for the transmitting device 201 to transmit packets so that they can reach the decoding section 302 before the reproduction time. However, in wireless communications, frequent retransmissions can occur, and packets in some cases fail to reach the decoding section 302 before the reproduction time. These packets should not be transmitted, but should be discarded from the transmission buffer 104 in the transmitting device 201. In the previous case where buffer is prepared for Tdb, the transmission buffer 104 on the transmitting end upon the generation of a packet sets its lifetime, which indicates the valid period, to a value with the Tdb being counted in. The lifetime is compared to the current time when a transmission request is received from the communications section 108. If the lifetime is exceeded, the transmission buffer 104 discards the packet. Discarded packets cannot be reproduced at the receiving device 202. The result is a disturbance in video replay.

To prevent the occurrence of such video replay disturbance, the transmitting device 201 of the present embodiment performs encoding rate control that can quickly react to changes in communications environment. The following will describe the implementation of the encoding rate control by way of exemplary methods.

(Encoding Rate Control Method 1-1)

Figure 12:
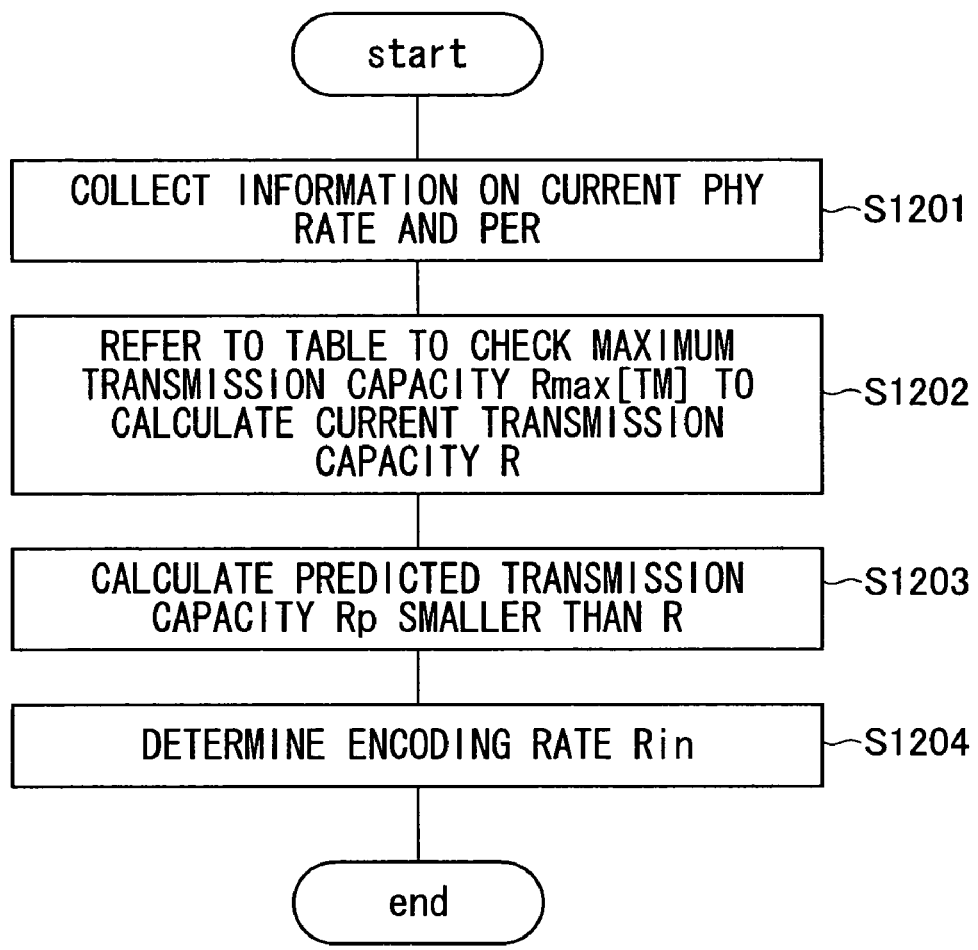
FIG. 12 is a flow chart illustrating the flow of a first method of the encoding rate control process in the transmitting device illustrated in FIG. 3.
Figure 13:
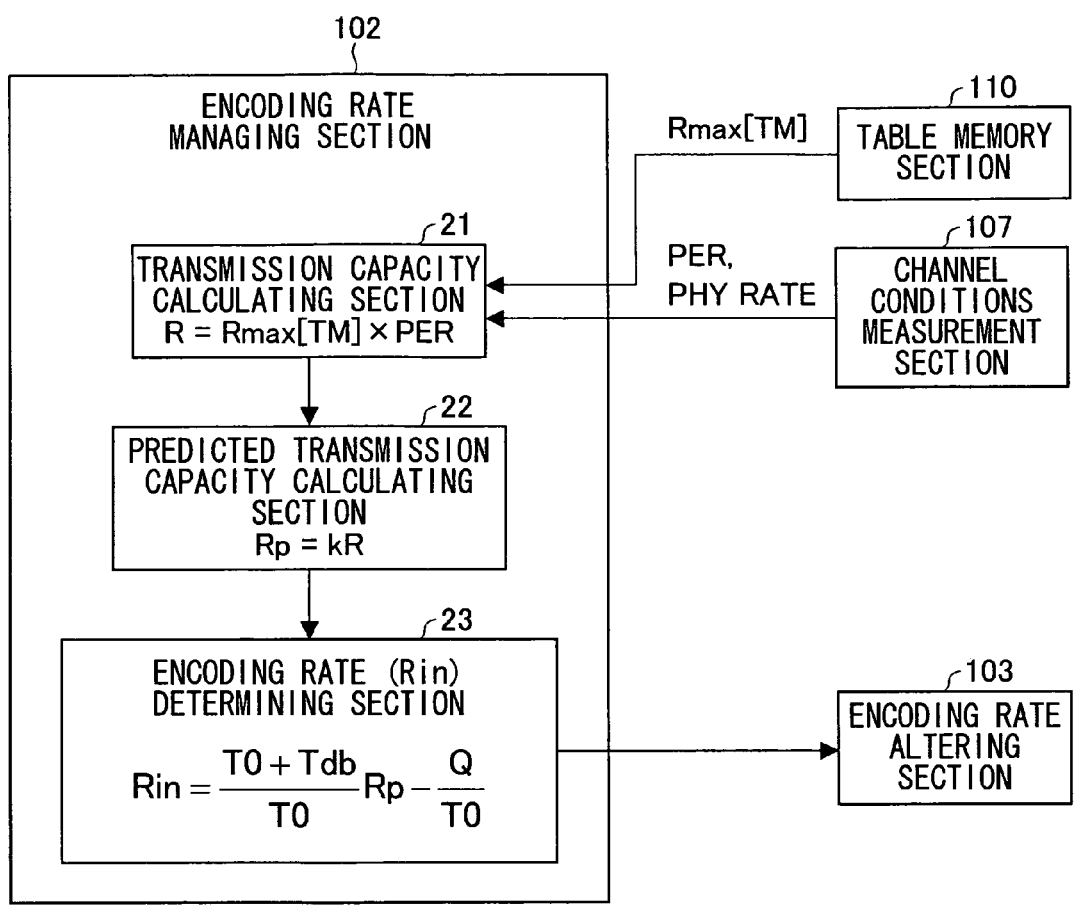
FIG. 13 is a functional block diagram illustrating the internal configuration of an encoding rate managing section which carries out the encoding rate control process illustrated in FIG. 12.
Figure 14:
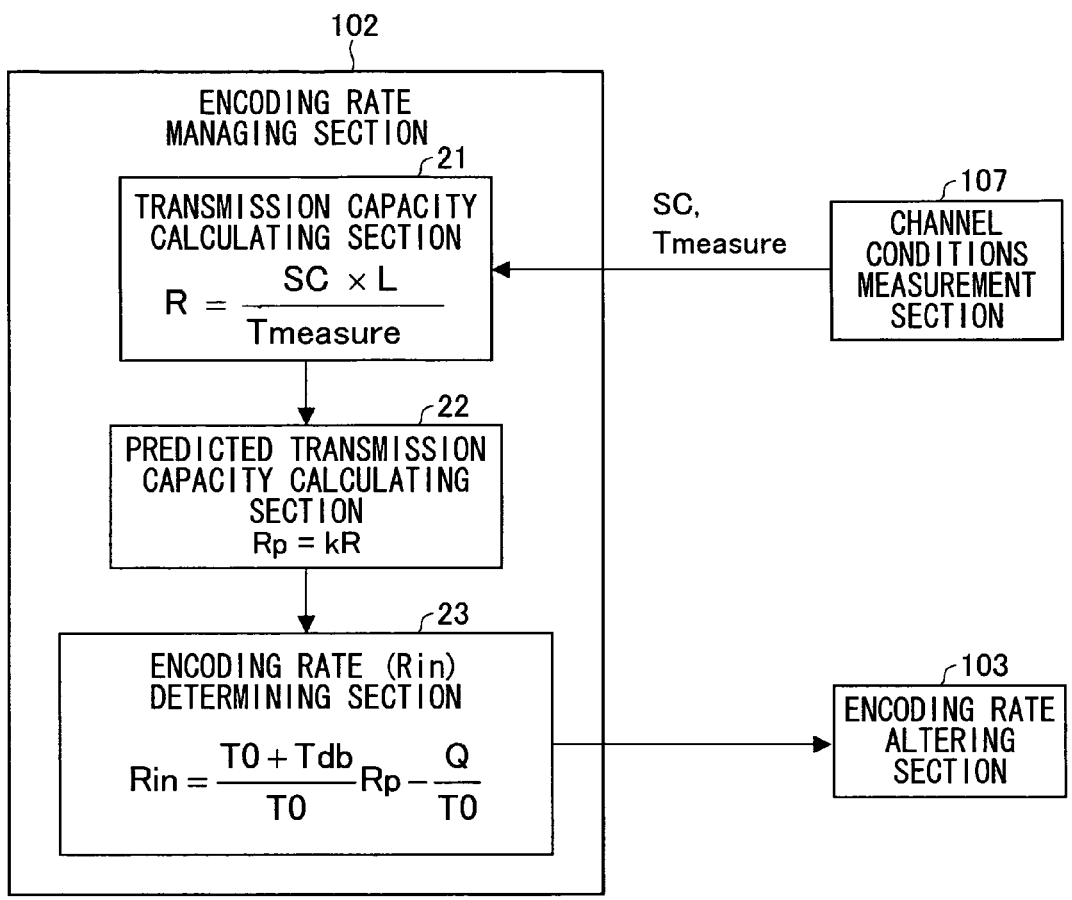

Referring to FIG. 12 and FIG. 13, a first encoding rate control method is described which is implemented in the encoding rate managing section 102 in FIG. 1. FIG. 12 is a flow chart illustrating the flow of an encoding rate control process in a transmitting device. FIG. 13 is a functional block diagram more specifically showing the internal configuration of the encoding rate managing section 102 implementing the encoding rate control process.

According to the first encoding rate control method, the encoding rate managing section 102 determines a next video rate Rin by using the table in FIG. 7 and the information on the current PHY rate and PER measured by the channel conditions measurement section 107. The table in FIG. 7 is an example of a table indicating PHY rate settings and maximum transmission capacity at the PHY rate settings. The table is stored in the table memory section 110.

To carry out the encoding rate control, the encoding rate managing section 102 in the transmitting device 201 of the present embodiment includes a transmission capacity (R) calculating section 21, a predicted transmission capacity (Rp) calculating section 22, and an encoding rate (Rin) determining section 23 (see FIG. 13).

Before the transmission of stream data as explained above, the HC function implementing section 7 in the transmitting device 201 and the receiving device 202 makes QoS parameter settings. After that, the transmitting device 201 starts the transmission of the stream data ("start" in FIG. 12). As the transmitting device 201 starts the transmission of the stream data, the transmission capacity calculating section 21 in the encoding rate managing section 102 collects information on the PHY rate currently in use and the packet error rate (PER) from the channel conditions measurement section 107 (S1201).

Next, the transmission capacity calculating section 21 checks a maximum transmission capacity (Rmax[TM]) based on the information on the PHY rate by referring to the table shown in FIG. 7 (S1202). The maximum transmission capacity is a maximum throughput that can be achieved at a hypothetical 0% packet error rate under good channel conditions using up all the bandwidth allocated to the transmitting device 201.

When the bandwidth is secured by HCCA, the Rmax[TM] can be uniquely determined from the currently used PHY rate, because it is ensured that a predetermined communications bandwidth is allocated as a TXOP for a predetermined period. This maximum throughput however takes different values depending on the packet length and the type of ACK.

The timescale for PER measurement may be given in terms of any time period that provides a sufficiently accurate PER. In addition, the table in FIG. 7 is prepared assuming that one of the PHY rates, 36 Mbps, 24 Mbps, or 12 Mbps, will be used. A different table may be prepared assuming other PHY rates: e.g. 54 Mbps, 48 Mbps, 18 Mbps, 9 Mbps, and 6 Mbps.

Still referring to S1202, as the Rmax[TM] and the PER are obtained, the transmission capacity calculating section 21 calculates the current transmission capacity R from equation (1):

$$R=R\max[TM]\times(1-\text{PER}/100) \quad (1)$$

The obtained R is the maximum throughput that can be achieved under channel conditions measured, and provides an indicator for the channel conditions at that particular time. For example, if PER=20% at a PHY rate of 36 Mbps (TM=1), R=9 Mbps×(1−0.2)=7.2 Mbps.

A typical encoder or translator will introduce a delay on the order of milliseconds before the encoding rate managing section 102 sets an encoding rate for stream data based on the information given by the channel conditions measurement section 107, and the encoding rate altering section 103 actually alters the encoding rate.

Also, for a typical encoder or translator, once the encoding rate managing section 102 sets an encoding rate for the stream data, the rate cannot normally be altered for one, subsequent GOP (Group Of Picture period) the encoding rate altering section 103 maintains an invariable encoding rate.

Accordingly, we have considered these two translator features in devising encoding-rate determining control implemented on the encoding rate altering section 103 by the encoding rate managing section 102 of the present embodiment.

TGOP here is defined as the duration of one GOP. It is a constant value determined from the MPEG compression scheme. In the present embodiment, TGOP=500 (ms); this is however by no means limiting the present invention. In addition, Tdelay (s) is defined as a delay, introduced by the encoding rate altering section 103 actually altering the encoding rate after the encoding rate managing section 102 makes an encoding rate setting for stream data according to the information supplied from the channel conditions measurement section 107. Tdelay is a constant value determined from the performance of the encoding rate managing section 102 and the encoding rate altering section 103. In the present embodiment, Tdelay is 150 (ms); this is however by no means limiting the present invention.

Using the terms TGOP and Tdelay, the maximum delay introduced by the encoding rate altering section 103 actually altering the encoding rate for the stream data after the encoding rate managing section 102 makes an encoding rate setting, is expressed as TGOP+Tdelay. Here we suppose a steady state where the encoding rate Rin setting by the encoding rate managing section 102 is always equal to the transmission capacity R and the queue size Q is also always constant. In the steady state, the encoding rate managing section 102 retains the encoding rate Rin setting that is equal to the transmission capacity R.

Then, suppose that the transmission capacity R has fallen to Rp=kR (0<k<1), the encoding rate altering section 103 being disabled from altering the stream data encoding rate for a period of T0=TGOP+Tdelay. T0 seconds after the transmission capacity fallen to Rp, the queue size Q1 is $$Q1=Q+(R\text{in}-Rp)\times T0$$

In addition, the amount of data, Qdb, that can be transmitted in the period Tdb at the transmission capacity Rp is given by $$Qdb = Rp \times Tdb$$

If the transmission capacity Rp remains unchanged also after the T0 seconds, and Q1 is less than or equal to Qdb, no packets are discarded. Therefore, if Rin is obtained so that it satisfies the conditions, $$Q1 \leq Qdb, \text{ and}$$

$$Rin \leq Rp \times (T0+Tdb)/T0 - Q/T0,$$

no packets are discarded even when the transmission capacity has fallen to Rp, disabling the encoding rate altering section 103 from altering the encoding rate for T0.

In addition, a greater Rin enables a higher quality video replay on the receiving device 202. Rin is thus calculated from equation (2):

$$Rin = Rp \times (T0+Tdb)/T0 - Q/T0 \qquad (2)$$

Note that if the encoding rate calculated from equation (2) falls below the previously set minimum value, 1 Mbps, the rate is set to 1 Mbps; if it exceeds the maximum value, 9 Mbps, the rate is set to 9 Mbps. Controlling the encoding rate based on Rin calculated from equation (2) allows no packets to be discarded even if the transmission capacity falls to Rp, disabling alteration of the encoding rate for T0.

Specifically, the encoding rate managing section 102 calculates a smaller predicted transmission capacity Rp than the current transmission capacity R in S1203 and determines the encoding rate Rin in S1204. Accordingly, even if the communications environment quickly deteriorates from a good state, no packets are discarded.

In addition, under this control, the encoding rate Rin can be immediately increased if the communications environment recovers from a poor state to a good state. Reasons why this is possible is described next, assuming that the settings: Tdb=1.5 s, T0=0.65 s, and k=0.33. If the communications environment has recovered to a good state, and the queue size Q=0, the encoding rate Rin is given by $$Rin = 1.1 \times R \qquad (3)$$

Since the communications state has now recovered, assume that the PHY rate is 36 Mbps, and PER=0%. The transmission capacity R obtained in S1202 is 9 Mbps. Since the encoding rate Rin given by equation (3) exceeds the maximum encoding rate, or 9 Mbps, it is set to the maximum of 9 Mbps. In this manner, stream data rate settings with high tracking capability is possible not only when the channel conditions deteriorate, but also when the conditions recover.

(Encoding Rate Control Method 1-2)

In some cases, the channel conditions measurement section 107 may be unable to obtain the PHY rate, or the table memory section 110 may be unable to generate a table. In such cases, the transmission capacity R cannot be calculated in S1201 and S1202 shown in FIG. 12. However, an encoding rate control process, like the one in control method 1-1 described above, is still possible if the transmission capacity R is replaced with a throughput in a certain period. Details about the control are now given in reference to FIG. 14.

First, the channel conditions measurement section 107 sends the number of successfully transmitted packets SC and the period Tmeasure in which the packets were counted to the transmission capacity calculating section 21. If all packets have the same length (=L), the throughput in Tmeasure as a replacement of the transmission capacity R is given by:

$$R = SC \times L / Tmeasure \qquad (4)$$

If not all packets have the same length, the throughput is still calculable by the channel conditions measurement section 107 monitoring the length of each packet and forward the total amount of data of successfully transmitted packets (equal to SC×L in equation (4)) to the transmission capacity calculating section 21. With this throughput being substituted for the transmission capacity R, the subsequent steps are carried out similarly to control method 1-1 so that the predicted transmission capacity calculating section 22 calculates the predicted transmission capacity. Rp and the encoding rate determining section 23 determines the encoding rate Rin.

Next, differences in encoding rate control between when reference can be made to the table memory section 110 and when it cannot will be described. For example, when the encoding rate Rin is 9 Mbps, the PHY rate is 36 Mbps, and the communications environment is good, both transmission capacities are 9 Mbps.

However, when the encoding rate Rin is 1 Mbps, the PHY rate is 36 Mbps, the communications environment is good (PER=0%), and the queue size Q is 0, the transmission capacity R is 9 Mbps, because the case where reference can be made to the table memory section 110 is a case where PER=0%. Therefore, the encoding rate Rin can be immediately increased to 9 Mbps.

When reference cannot be made to the table, the encoding rate Rin is 1 Mbps. So, even if PER=0%, the transmission capacity R is 1 Mbps. According to equation (3), the encoding rate can be gradually increased. If the PHY rate information is not obtained or reference cannot be made to the table, it is impossible to predict how much data is transmittable; it takes an extra time to bring the encoding rate Rin back to 9 Mbps.

The problem can be solved, for example, by increasing the coefficient of the transmission capacity R in equation (3) (1.1 in equation (3)). The coefficient of the transmission capacity R varies depending on T0, Tdb, and k. However, T0 is constant for each device, and Tdb should not be changed during communications. Therefore, changing k in accordance with the channel conditions solves the problem.

For example, the transmission capacity may possibly fall greatly when it is high; so, k may be set to 0.33. When the transmission capacity is low, it cannot fall greatly; so, k may be set to 0.5. When the transmission capacity R is small, this solution sets the coefficient of the transmission capacity R to a value greater than 1.1 in equation (3). The encoding rate Rin increases more quickly.

When PER=0% or the queue size is 0, the encoding rate Rin can be made to increase more quickly through control where k=1, for example.

Changing the value of k according to channel conditions in the predicted transmission capacity calculating section 22 in the above manner enables stream data rate settings with high tracking capability not only when the channel conditions deteriorate, but also when the conditions recover, even if the channel conditions measurement section 107 cannot obtain the PHY rate or the reference cannot be made to table in the table memory section 110.

(Encoding Rate Control Method 2)

Figure 5:
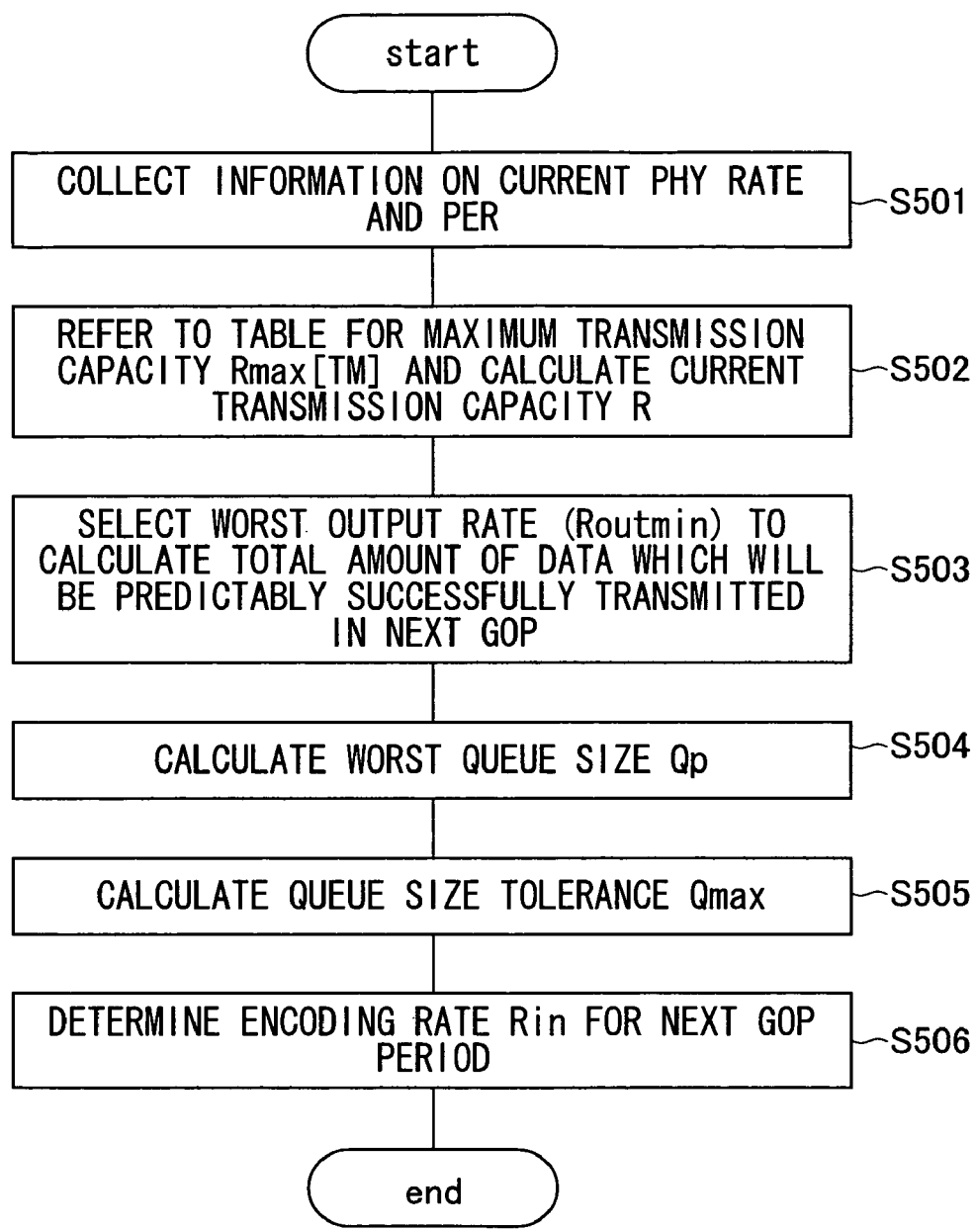
FIG. 5 is a flow chart illustrating the flow of a second method of an encoding rate control process in the transmitting device illustrated in FIG. 3.
Figure 6:
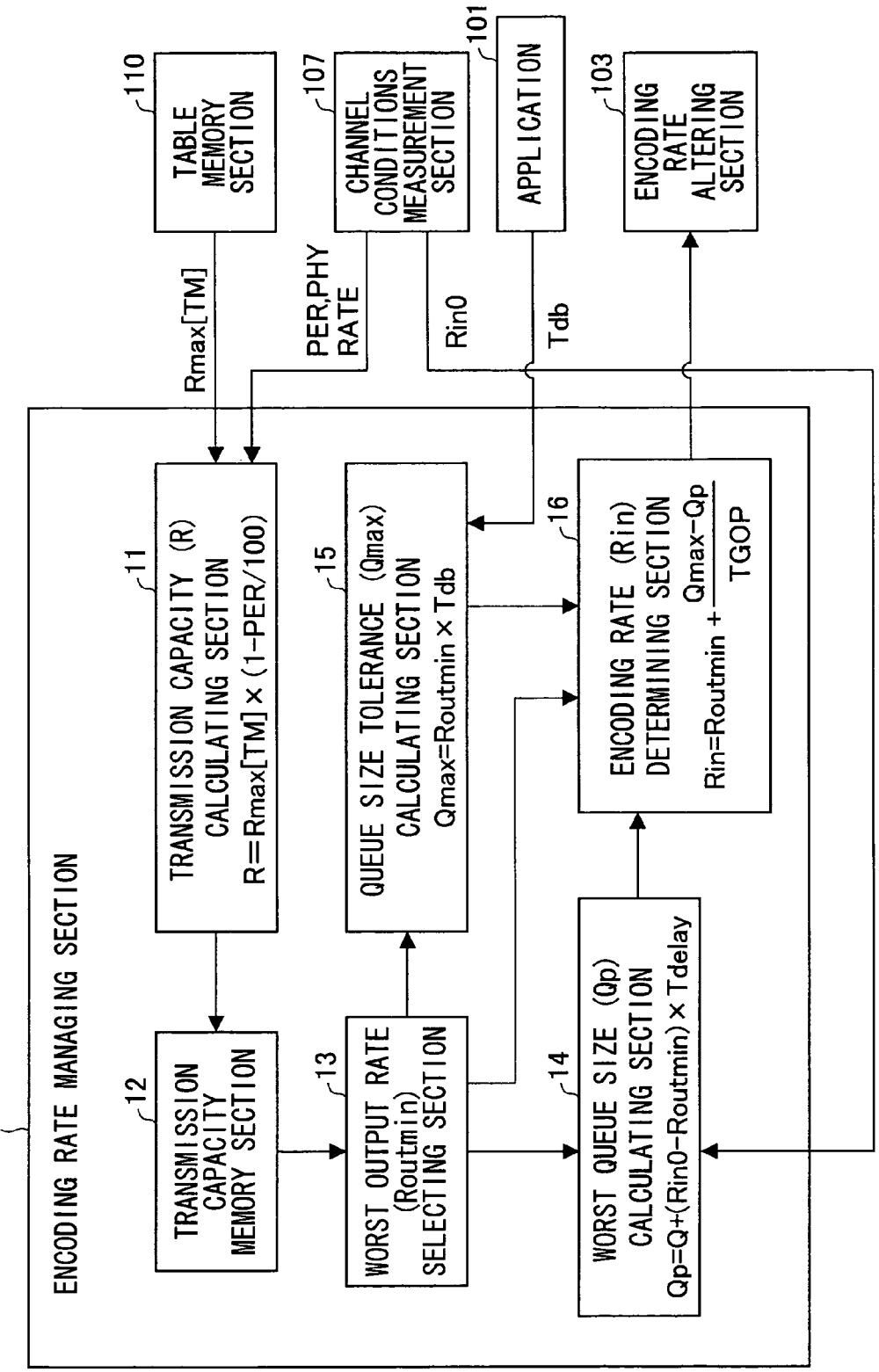
FIG. 6 is a functional block diagram illustrating the internal configuration of an encoding rate managing section which carries out the encoding rate control process illustrated in FIG. 5.
Figure 8:
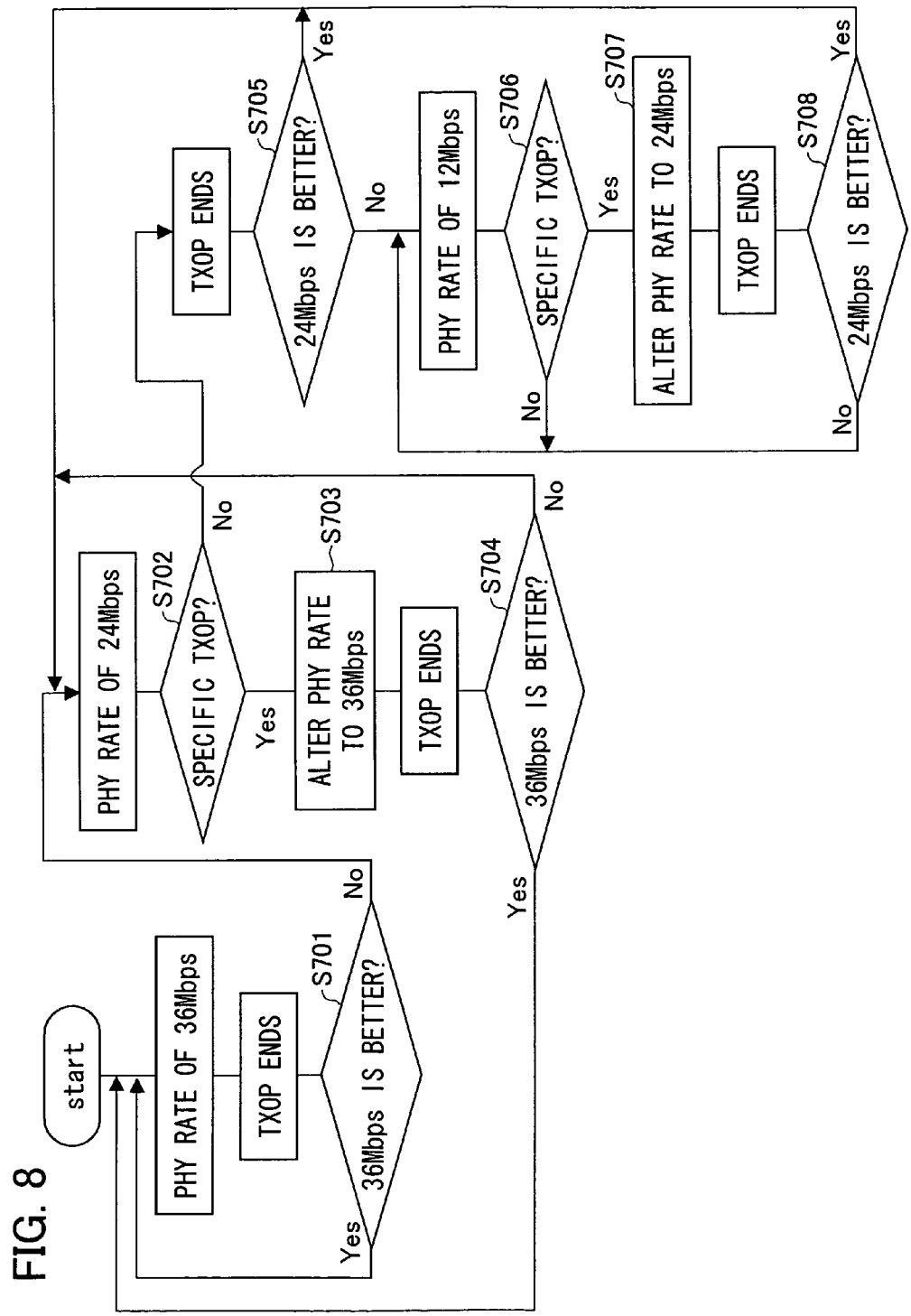
FIG. 8 is a flow chart illustrating the flow of an error resilience control process in the transmitting device illustrated in FIG. 3.

Now, the second encoding rate control method in the encoding rate managing section 102 of FIG. 1 will be described in reference to FIGS. 5 and 6. FIG. 5 is a flow chart illustrating the flow of an encoding rate control process in a transmitting device. FIG. 6 is a functional block diagram showing the internal configuration of the encoding rate managing section 102 which carries out the encoding rate control process more specifically.

To carry out the encoding rate control, the encoding rate managing section 102 in the transmitting device 201 of the present embodiment includes a transmission capacity (R) calculating section 11, a transmission capacity memory section 12, a worst output rate (Routmin) selecting section 13, a worst queue size (Qp) calculating section 14, a queue size tolerance (Qmax) calculating section 15, and an encoding rate (Rin) determining section 16 (see FIG. 6).

Referring to FIG. 5, the following will describe the encoding rate control carried out by the encoding rate managing section 102.

Before the transmission of stream data as explained above, the HC function implementing section 7 in the transmitting device 201 and the receiving device 202 makes QoS parameter settings. After that, the transmitting device 201 starts the transmission of the stream data ("start" in FIG. 5). As the transmitting device 201 starts the transmission of the stream data, the transmission capacity calculating section 11 in the encoding rate managing section 1 collects information on the PHY rate currently in use and the packet error rate (PER) from the channel conditions measurement section 107 (S501).

Next, the transmission capacity calculating section 11 determines a maximum transmission capacity (Rmax[TM]) based on the information on the PHY rate by referring to the table shown in FIG. 7 (S502). The maximum transmission capacity in FIG. 7 is a maximum throughput that can be achieved at a hypothetical 0% packet error rate under good channel conditions using up all the bandwidth allocated for a period measured by the transmitting device 201. When the bandwidth is secured by HCCA, the Rmax[TM] can be uniquely determined from the currently used PHY rate, because it is ensured that a predetermined communications bandwidth is allocated as a TXOP for a predetermined period. This maximum throughput however takes different values depending on the packet length and the type of ACK.

The timescale for PER measurement may be given in terms of any time period that provides a sufficiently accurate PER. In addition, the table in FIG. 7 is prepared assuming that one of the PHY rates, 36 Mbps, 24 Mbps, or 12 Mbps, will be used. A different table may be prepared assuming other PHY rates: e.g. 54 Mbps, 48 Mbps, 18 Mbps, 9 Mbps, and 6 Mbps.

Still referring to S502, as the Rmax[TM] and the PER are obtained, the current transmission capacity R is calculated from the equation (1), as in the case of the control method 1-1.

In the control method 2, we have considered TGOP and Tdelay described in the control method 1-1 and these two times in devising encoding-rate determining control implemented on the encoding rate altering section 103 by the encoding rate managing section 102.

The R obtained in S502 is stored in the transmission capacity memory section 12. Subsequently, the worst output rate selecting section 13 selects the worst ever output rate (Routmin, worst transmission capacity) of the transmission capacities stored in the transmission capacity memory section 12 to calculate a total amount of data which will be predictably successfully transmitted in a next GOP (Group Of Picture) period (S503).

Now, the method of selecting the worst ever output rate in S503 will be explained in more detail. Incidentally, the output rate selected in S503 may not be the one which is ever worst, but the one measured by the channel conditions measurement section 107 immediately before the measurement at the start of the encoding rate control. However, the video disturbance occurs when the communications environment rapidly deteriorated from a good state and the resulting poor state has persisted for some period. Therefore, it is too difficult to predict a rapidly deteriorating communications environment with the above method. Accordingly, the encoding rate managing section 102 preferably controls the encoding rate assuming that the poor communications environment can occur at any time.

A rapid deterioration from a good state of the communications environment is a likely indicator that similar deteriorations have ever occurred. Therefore, in the present embodiment, the output rates (transmission capacity) in the past are stored in the transmission capacity memory section 12 in the encoding rate managing section 102 so that the worst output rate selecting section 13 can select the output rate at which the fewest ever packets were successfully transmitted as the worst output rate from the records. In S503 when channel conditions are selected, the worst ever channel conditions are assumed to continue until the next GOP is ended. The total amount, P, of data that are transmitted from the communications section 108 in the next GOP period is calculated from equation (5):

$$P = Routmin \times TGOP \tag{5}$$

The "past" here is defined as the time period from the start of a stream data transmission up to the present time. If there was ever a period during which transmission capacity is 0 Mbps, the encoding rate managing section 102 makes an encoding rate setting on the assumption that the channel conditions under which the transmission capacity is 0 Mbps will continue forever. Accordingly, the past is appropriately defined as the last few seconds. If the worst ever output rate is below a certain threshold, the Routmin may be set to that threshold value.

The worst output rate selecting section 13 determines the total amount, P, of data that are predictably successfully transmitted in the next GOP period as explained above. The information on the Routmin selected and the P determined in S503 are fed to the worst queue size calculating section 14, the queue size tolerance calculating section 15, and the encoding rate determining section 16.

Subsequently, the worst queue size calculating section 14 calculates a worst queue size (Qp) for use when the next GOP is started (when the encoding rate is altered after Tdelay) from following equation (6) based on the Routmin and current queue size Q supplied from the worst output rate selecting section 13 and the current encoding rate Rin0 measured by the channel conditions measurement section 107 (S504);

$$Qp = Q + (Rin0 - Routmin) \times Tdelay \tag{6}$$

The worst queue size Qp obtained here is the amount of data predicted to be buffered by the transmission buffer 104 if the worst transmission capacity continues for a predetermined period. In other words, the worst queue size Qp is the queue size calculated assuming the occurrence of the worst output rate and that Tdelay is a time since an encoding rate altering instruction is issued until the communications speed is actually altered.

Next, the queue size tolerance calculating section 15 calculates a maximum value of the queue size (Qmax or "queue size tolerance") from the Routmin and Tdb (here, 1 (s)) supplied from the worst output rate selecting section 13 (S505). That is, the Qmax is determined from the worst output rate and the information on the valid period of the stream data. The Qmax is correctly described as the amount of data that can be stored in the transmission buffer 104. The information Tdb on the valid period of the stream data is transmitted from the HC function implementing section 7 via the application 101 before the stream data is transmitted.

Suppose encoding rate control which maintains the queue size at 0. Then, the amount of data of packets that can be used for stream data in a next GOP is P-Qp. This P-Qp divided by the duration of the GOP (i.e., TGOP) is the encoding rate for stream data in the next GOP. However, the queue size does not need to be retained at 0. A packet only needs to be successfully transmitted within its lifetime of 1 (s) after generation. It is possible to transmit disturbance-free video even if the transmission buffer is always holding some packets. Accordingly, in S505, the Qmax is calculated from equation (7):

$$Q\mathrm{max} = Rout\mathrm{min} \times Tdb \qquad (7)$$

Packets can be buffered until the queue size reaches the Qmax. Therefore, the amount of data of packets that can be used for stream data in the next GOP is P-Qp+Qmax. Dividing P-Qp+Qmax by the duration of the GOP (i.e., TGOP) yields the encoding rate Rin for stream data in the next GOP.

Accordingly, the encoding rate determining section 16 calculates the encoding rate Rin for the next GOP period from following equation (8) based on the Routmin supplied from the worst output rate calculating section 13, the Qp supplied from the worst queue size calculating section 14, and the Qmax supplied from the queue size tolerance calculating section 15 (S506).

$$\begin{aligned} Rin &= (P - Qp + Q\mathrm{max})/TGOP \qquad (8) \\ &= (Rout\mathrm{min} \times TGOP - Qp + Q\mathrm{max})/TGOP \\ &= Rout\mathrm{min} + (Q\mathrm{max} - Qp)/TGOP \end{aligned}$$

In S506, if the encoding rate falls below the previously set minimum value, 1 Mbps, the rate is set to 1 Mbps; if it exceeds the maximum value, 9 Mbps, the rate is set to 9 Mbps. Owing to this Qmax concept, one does not have to worry if the channel conditions temporarily deteriorate until the transmission buffer reaches the Qmax. Thus, high encoding rates are retained.

The information Tdb on the valid period of the stream data varies from one receiving end device to the other because the buffer capacity varies. Accordingly, the transmitting device 201 receives the information Tdb on the valid period of this stream data via the HC function implementing section 7 as information on QoS for the stream data exchanged with the receiving device 202. The resulting Tdb information is sent to the queue size tolerance calculating section 15 via the application 101. This changes the numerical value of equation (7). As a result, the encoding rate Rin is also changed.

The above process enables encoding rate control which enables high quality video transfer when the communications environment is in a good state and disturbance-resilient video transfer when the channel conditions has deteriorated.

When the bandwidth is secured by HCCA, the transmitting device 201 which implements the encoding rate control method 1-1 or 2, since provided with the HC function implementing section 7, can know how much of the bandwidth is secured. Accordingly, a method is employed whereby there is prepared a table containing the maximum transmission capacity at the PHY rates in the bandwidth in advance so that the table can be used to determine which encoding rate control is the most effective. In actual practice, however, another device may have the HC functions. When this is the case, the transmitting device 201 can freely transmit packets after it receives a packet indicating a grant of bandwidth. Thus, normally, this particular case can be handled in the same fashion as more general cases where the transmitting device 201 possess the HC functions.

However, if the channel conditions between the device with the HC functions and the transmitting device 201 deteriorate, the packet indicating a grant of bandwidth may not be received due to an error, which leads to only a small bandwidth allocated. To deal with such cases, if the device possessing the HC functions is separately provided from the transmitting device 201, the channel conditions measurement section 107 measures the communications bandwidth actually allocated in a predetermined period. Then, a table is prepared containing the maximum transmission capacity for each PHY rate on the assumption that the communications bandwidth is used up, the channel conditions are good and the packet error rate is 0%. The table is updated every time the communications bandwidth is measured for use in the encoding rate control. Thus, the invention can deal with the HC functions being possessed by a device other than the transmitting device 201. In addition, as described in the control method 1-2, the invention can deal with the HC functions being possessed by a device other than the transmitting device 201 by adopting the encoding rate control not using the table itself.

In addition, as mentioned earlier, it is preferable at present to carry out the control in view of the EDCA communications where a transmission right is granted at a priority-based probability and the best-effort types of communications, in addition to the transmitting device which secures the bandwidth by HCCA for transmission of the stream data. For such communications, the channel conditions measurement section 107, in a predetermined period, measures the bandwidth used by the transmitting device and the empty bandwidth which is used by no communications devices. The sum of the durations will be considered as the bandwidth successfully secured by the transmitting device. Then, a table is prepared containing the maximum transmission capacity on the assumption that the communications bandwidth is used up, the channel conditions are good, and the packet error rate is 0%. The table is updated every time the communications bandwidth is measured for use in the encoding rate control. Thus, the invention can deal with EDCA and best effort types of communications. In addition, as described in the control method 1-2, the invention can deal with EDCA communications and best-effort types of communications by adopting the encoding rate control not using the table itself.

The above encoding rate control enables stream data rate settings with high tracking capability not only when the channel conditions deteriorate, but also when the conditions recover. In addition, since the transmitting device 201 determines the channel conditions, the receiving device 202 needs no mechanism which creates special feedback information for the encoding rate control.

(Encoding Rate Control Method 3)

Figure 15:
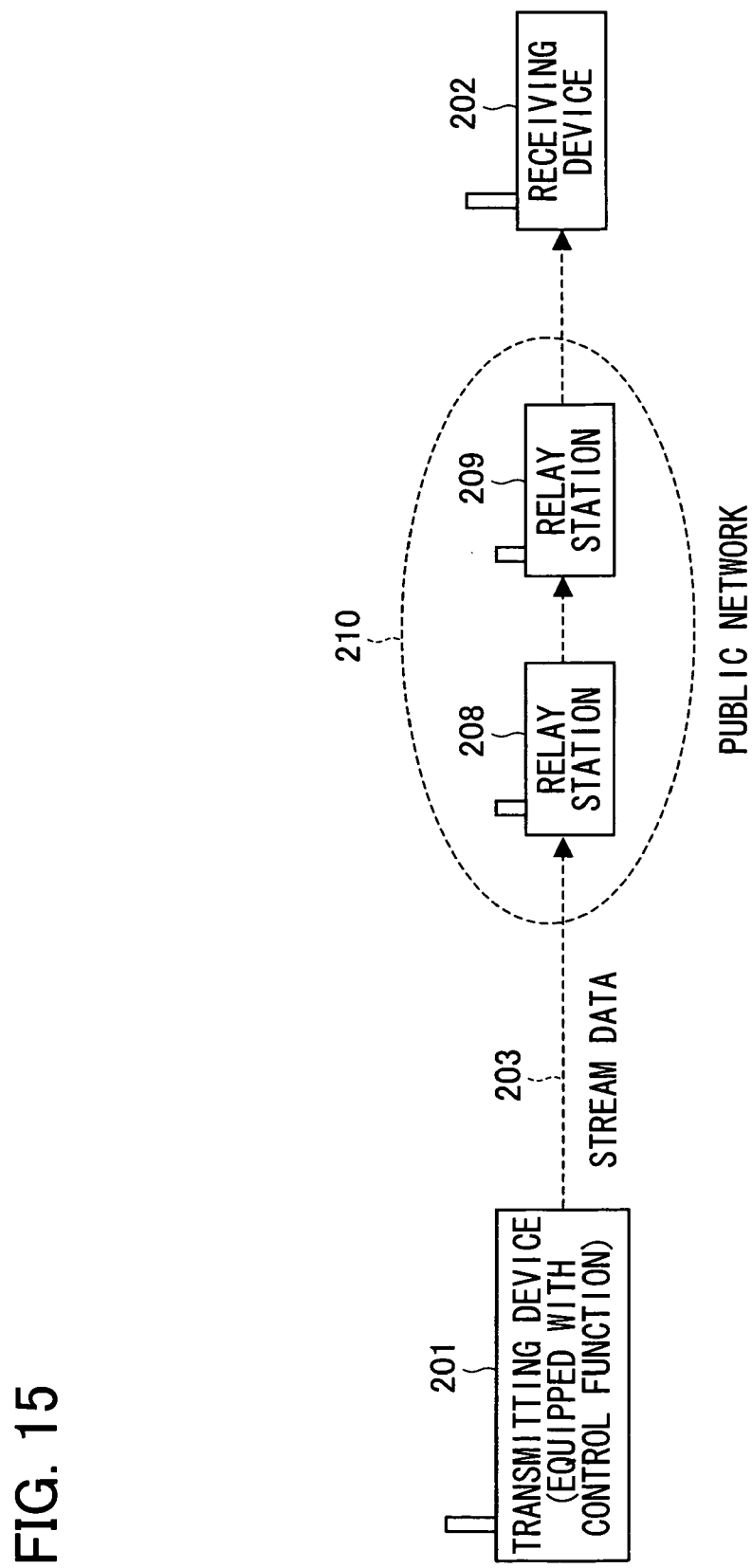
FIG. 15 is a diagram schematically illustrating a configuration of a communications system according to one embodiment of the present invention.

Next, let us consider a communications system in which the transmitting device does not directly communicate with the receiving device, but there are instead multiple relay stations 208, 209 between a transmitting device 201 and a receiving device 202 as in FIG. 15. In the system, the receiving device 202 transmits the transmitting device 201 an acknowledgement (ACK) for a packet received from the transmitting device 201.

In a communications system like the one in FIG. 15, the transmitting device 201 can know the receipt status of the receiving device 202 when it receives the ACK from the receiving device 202. The transmitting device 201 can also calculate transmission capacity from the amount of data received by the receiving device 202.

When the communications situation between the transmitting device 201 and the relay station 208 is good, and the communications situation between the relay station 209 and the receiving device 202 is very poor, the transmitting device 201 has a small queue size. Even if the receipt status at the receiving device 202 is poor, the transmitting device 201 sets the encoding rate to a high value.

Since the communications situation between the relay station 209 and the receiving device 202 is very poor, the relay station 209 has a queue size which keeps growing. The transmitting device 201, since unable to know the queue size in the relay station 209, continues to set the encoding rate to a high value. This may possibly lead to an occurrence of a queue size overflow in the relay station 209.

Accordingly, the transmitting device 201 not only needs to monitor its queue size, but also needs to monitor the sum of the queue sizes of all devices between the transmitting device 201 and the receiving device 202. To know the sum of the queue sizes accurately, information needs be fed back from the relay stations; in practice, however, it is impossible to equip all the relay stations with such a functions.

Accordingly, the encoding rate manage section 102 compares the total amount of data transmitted from the transmitting device 201 to the total amount of data received by the receiving device 202 which is indicated in ACKs. Thus, the section 102 can predict the sum of the queue sizes of all intervening devices.

For example, if the transmitting device is transmitting stream data at 9 Mbps whereas the receiving device 202 is sending back ACKs that indicate a sum of 1 Mbps, the sum of queue sizes is predicted to have grown 8 Mbit over one second. The transmitting device 201 records the predicted queue size sum and updates it (by either addition or subtraction) for every measurement to predict the current sum.

More specifically, letting the predicted queue size be represented by Q and the amount of data received by the receiving device 202 per unit time which is indicated in ACKs by R, the encoding rate Rin can be calculated by a similar method to equation (2) or equation (8).

With this encoding rate control method, the encoding rate control of the present invention becomes applicable to the Internet and mobile phone networks which include multiple relay stations between the transmitting device 201 and the receiving device 202. Further, none of the receiving device 202 and the relay stations 208, 209 needs to be equipped with a mechanism which generates special feedback information for the control of the encoding rate. In that case, a communications medium 203 may be an optical fiber, a telephone line, a coaxial cable, or a wireless communications medium at a mobile phone frequency band.

(PHY Rate Control)

The following will describe the error resilience control in the error resilience managing section 106.

Incidentally, the lifetime that indicates the valid period of the packet is determined in view of Tdb (here, 1 s) when the packet is generated. Therefore, in the case in which a period during which a rate of successful transmission is 0 continues more than 1 s, the loss occurs and brings the video disturbance. This problem occurs because, when the rate of successful transmission is 0, the channel conditions deteriorate and the amount of data, successfully transmitted (also referred to as "throughput") decreases. Methods for solving the problem can be (i) a control method for increasing the throughput, and (ii) a method in which lager buffers are prepared in the transmitting device 201 and the receiving device 202 to set larger maximum delay, so as to alleviate the video disturbance even when a time it takes to recover the channel conditions is long. However, the latter method is not practical because a real-time property deteriorates and the cost increases due to the use of the larger buffers. Here, according to the transmitting device 201 of the present embodiment, the error resilience is controlled for improvement of the throughput.

As described above, methods for altering the error resilience are, for example, a method for applying an error-correcting code to data, and a method for altering the PHY rate. However, strengthening the error resilience and increasing the communications bandwidth are in a trade-off relation. If the error resilience is strengthened when the channel conditions are good, the communication bandwidth is decreased carelessly, which is not preferable. For example, in the case of using the error correction code, it is possible to increase the error resilience in accordance with the amount of redundant data. In this case, however, the packet becomes long and a time it takes for transmission becomes long, so that the throughput decreases.

Figure 11:
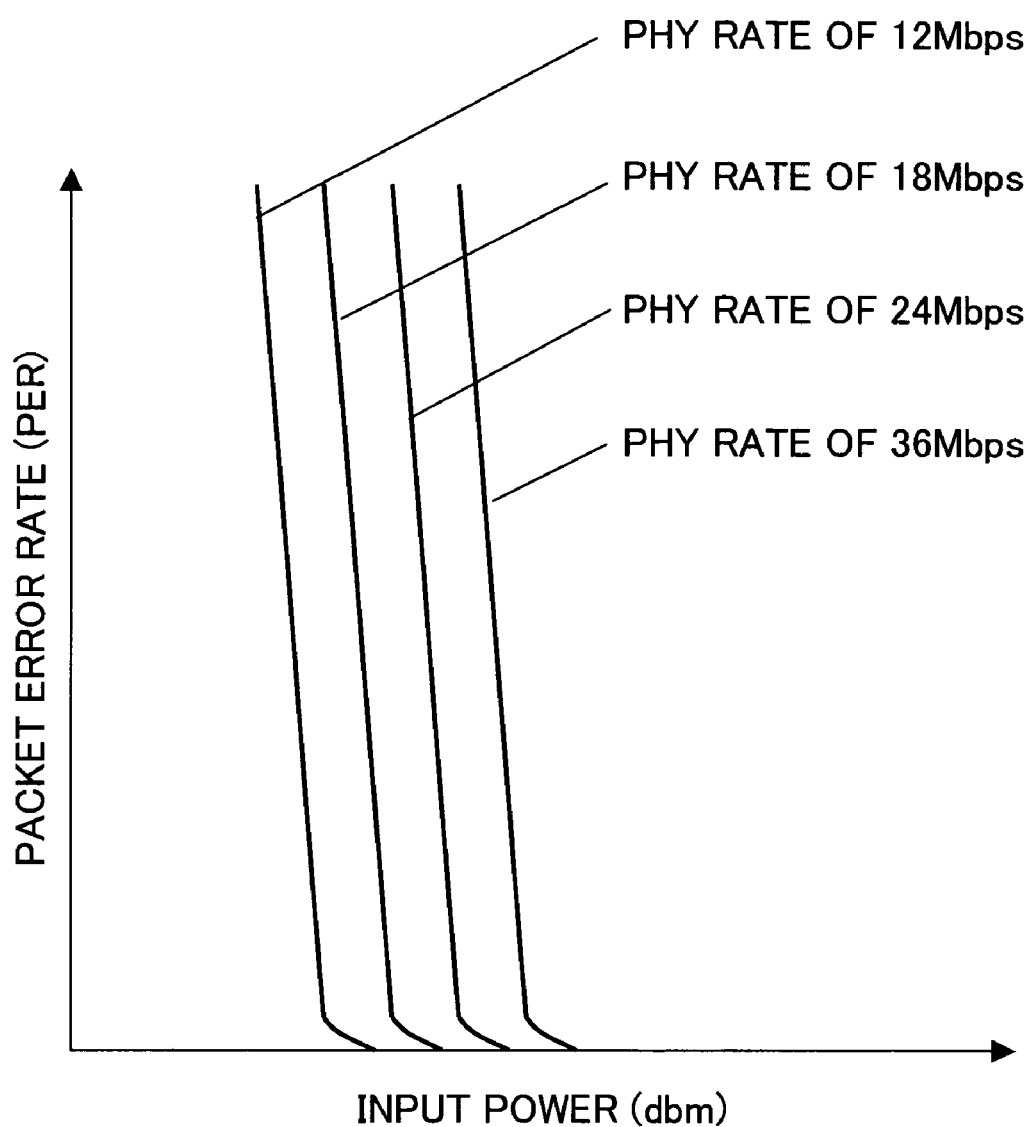
FIG. 11 is a graph showing relation between input power of each PHY rate and packet error rate.

FIGS. 10 and 11 show a relation between the PHY rate and the error resilience in 802.11a. As shown in FIG. 10, the strength of the error resilience depends on the modulation scheme and the encoding ratio. As shown in FIG. 11, if the received power (input power) is the same, the packet error rate drastically improves as the PHY rate decreases. Therefore, it is effective to control the PHY rate in the case in which the received power decreases due to changes in the environment, such as a case in which a shield (for example, person, device, etc.) passes through the communications channel.

Therefore, the transmitting device 201 of the present embodiment includes the error resilience managing section 106 for especially controlling the PHY rate to carry out the error resilience control. The following will describe in reference to the flow chart shown in FIG. 8, steps of the error resilience control carried out by the error resilience managing section 106.

Note that the HC function implementing section 7 secures the bandwidth by HCCA so that stream data can be transmitted at a maximum rate of 9 Mbps when the PHY rate is 36 Mbps. According to HCCA, the bandwidth is given in accordance with a measure of time, called TXOP. TXOP is in the order of milliseconds (for example, 8 ms). By using TXOP as a minimum unit for the PHY rate control, the PHY rate control is carried out by measuring PER in one TXOP. The PHY rates used for the control are 36 Mbps, 24 Mbps and 12 Mbps. In the PHY rate control carried out here, the maximum transmission capacity ($Rmax[TM]$) is confirmed in reference to the table shown in FIG. 7. The table shown in FIG. 7 is a table indicating a relation between a PHY rate and the maximum transmission capacity at the PHY rate (that is, the transmission capacity in the case in which PER is 0%), and the table is stored in the table memory section 110. Note that the current transmission capacity R can be obtained by the following equation:

$$Rmax[TM] \times (1-PER/100).$$

Before transmitting the stream data, the setting of parameters concerning QoS is carried out between the HC function implementing section 7 of the transmitting device 201 and the receiving device 202. After the setting, the transmitting device 201 starts transmitting the stream data ("start" shown in FIG. 8). After the end of one TXOP, the channel conditions measurement section 107 measures the PHY rate and the PER used in the TXOP. For example, the PHY rate currently set is 36 Mbps. In this case, the error resilience managing section 106 finds out an appropriate PHY rate in S701. In the case in which the error resilience managing section 106 judges that the higher throughput can be realized by setting the PHY rate to 24 Mbps (No in S701), the error resilience adding section 105 alters the PHY rate to 24 Mbps and transmits the following TXOP from the communications section. Meanwhile, in the case in which the PER is low in S701 and the error resilience managing section 106 judges that it is most effective to use the PHY rate of 36 Mbps (Yes in S701), the error resilience adding section 105 transmits the following TXOP from the communications section at the PHY rate of 36 Mbps. A specific procedure of this judgment method will be described later. If the PHY rate measured by the channel conditions measurement section 107 is 36 Mbps, it does not increase more than this rate. Therefore, the error resilience managing section 106 can judge only that the PHY rate is decreased in an arbitrary TXOP.

The following will describe the control in the case in which the PHY rate measured by the channel conditions measurement section 107 is 24 Mbps. In the case in which the PHY rate is 24 Mbps, a control of increasing the PHY rate to 36 Mbps and a control of decreasing the PHY rate to 12 Mbps are selectively carried out. As with the above-described case in which the PHY rate is 36 Mbps, in the control of decreasing the PHY rate to 12 Mbps, the channel conditions measurement section 107 measures the PHY rate and the PER in an arbitrary TXOP. Then, the error resilience managing section 106 finds out the appropriate PHY rate in S705. In the case in which the error resilience managing section 106 judges that the higher throughput can be realized by setting the PHY rate not to 24 Mbps but to 12 Mbps (No in S705), the error resilience adding section 105 decreases the PHY rate to 12 Mbps and transmits the following TXOP from the communications section 108. Meanwhile, in the case in which the error resilience managing section 106 judges that it is better to use the PHY rate of 24 Mbps (Yes in S705), the error resilience adding section 105 causes the communications section 108 to transmit at the original PHY rate of 24 Mbps in the subsequent TXOP. Thus, it is possible to easily find out, according to the PHY rate currently set and PER, which is more effective, the PHY rate currently set or the PHY rate that is one level lower than the PHY rate currently set. A specific procedure of this judgment method will be described later.

The following will describe the control in the case in which the PHY rate is increased from 24 Mbps to 36 Mbps. Even if the PHY rate is altered for the following TXOP to 36 Mbps because the current rate is 24 Mbps and PER is 0%, it is unpredictable whether or not the higher throughput than the throughput obtained when the PHY rate is 24 Mbps can be obtained. Here, in the case in which the PHY rate is 24 Mbps, the transmission is carried out at the PHY rate of 24 Mbps during a certain period of time. After this period (that is, after a predetermined period, such as 100 ms), the transmission is carried out at the PHY rate of 36 Mbps from a specific TXOP in S702 (S703).

In this TXOP, if the error resilience managing section 106 judges that the higher throughput can be realized at the PHY rate of not 24 Mbps but 36 Mbps (Yes in S704), the error resilience adding section 105 causes the communications section to transmit at the PHY rate of 36 Mbps in the subsequent TXOP. Otherwise (No in S704), the error resilience adding section 105 causes the communications section to transmit at the original PHY rate of 24 Mbps in the subsequent TXOP.

After the communication using the PHY rate of 24 Mbps is carried out during a certain period of time, the communication is carried out at the PHY rate of 36 Mbps from the specific TXOP in S702, so as to carry out the above-described judgment. Thus, it is possible to easily increase the PHY rate to the PHY rate that is one level higher. Even in the case in which the throughput is lower at the PHY rate that is one level higher, the throughput is low only in one TXOP in a certain period of time that is a short period of time. Therefore, it is possible to suppress decreasing the entire throughput.

The minimum value of the PHY rate is 12 Mbps in the error resilience managing section 106. Therefore, in the case in which the PHY rate measured by the channel conditions measurement section 107 is 12 Mbps, the control of increasing the PHY rate to 24 Mbps is the only concern. This control can be carried out in the same manner as the above-described control of increasing the PHY rate from 24 Mbps to 36 Mbps. That is, the communication is carried out at the PHY rate of 12 Mbps during a certain period of time, and then the communication is carried out at the PHY rate of 24 Mbps from the specific TXOP in S706 (S707). In S708, the error resilience managing section 106 judges in accordance with the channel conditions in the TXOP, which PHY rate can realize the higher throughput, 12 Mbps or 24 Mbps.

Figure 9:
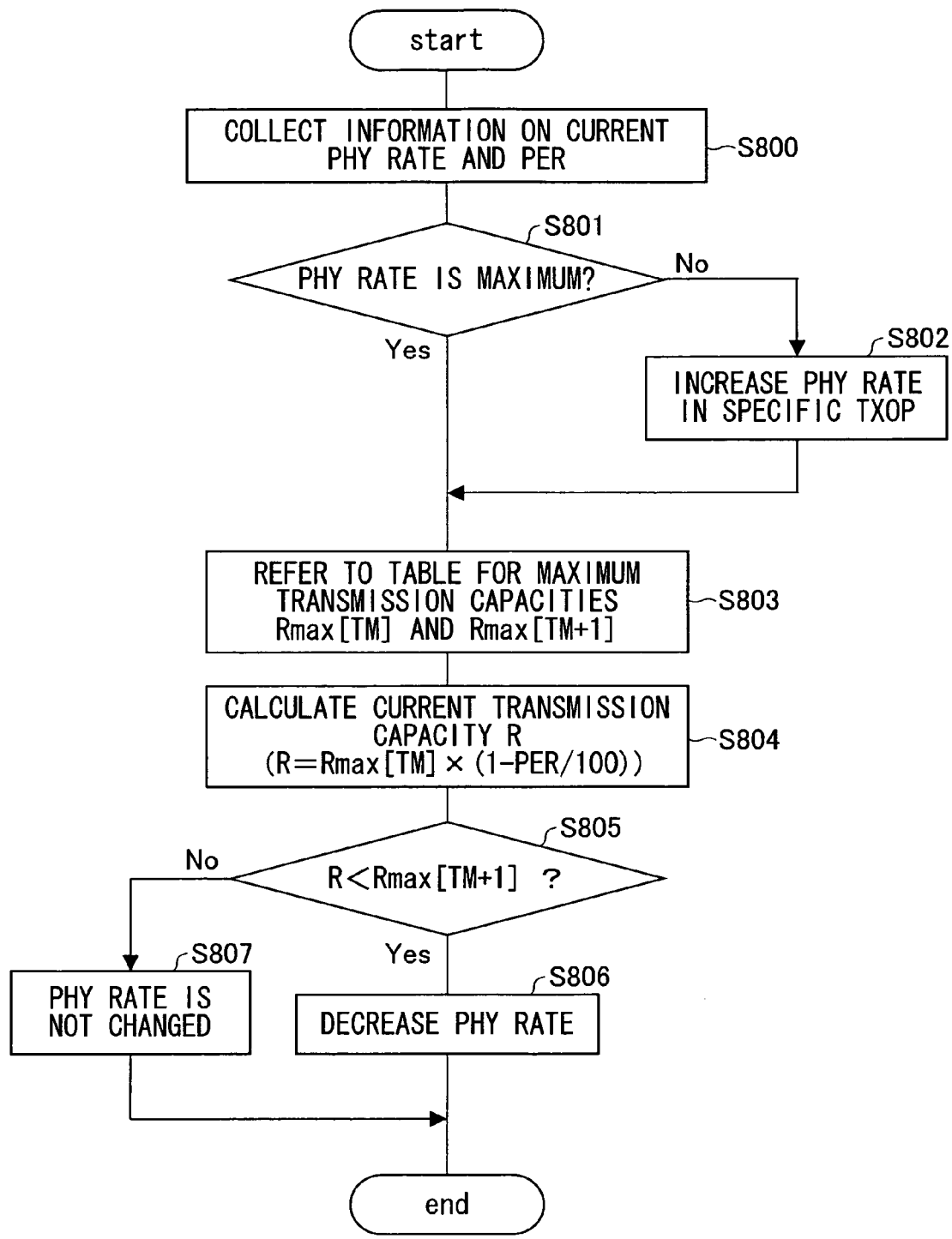
FIG. 9 is a flow chart illustrating steps of judging which of two PHY rates is better in the error resilience control in the transmitting device illustrated in FIG. 3.

The following will describe in reference to the flow chart of FIG. 9, a method for judging which PHY rate is better in S701, S704, S705 and S708, that is, a method for judging which PHY rate can secure a higher transmission capacity.

In the transmitting device 201, a bandwidth for the stream data to be transmitted in the case in which the PHY rate of 36 Mbps is used is secured by HCCA in advance. As described above, the HC function implementing section 7 secures the bandwidth by HCCA so that stream data can be transmitted at a maximum rate of 9 Mbps when the transmission rate (PHY rate) of the physical layer is 36 Mbps. The relation between the PHY rate and the maximum transmission capacity in a predetermined period is shown by the table of FIG. 7

First, the channel conditions measurement section 107 measures a current communications bandwidth, and observes a current PHY rate. In addition, the channel conditions measurement section 107 acquires from the communications section 108 the receipt status of packet receipt acknowledge from the receiving device 202, and calculates PER in accordance with the information of the receipt status. Then, information concerning the PHY rate and PER obtained here is transmitted to the error resilience managing section 106 (S800).

The error resilience managing section 106 judges whether or not the current PHY rate transmitted is the maximum PHY rate in the current communications bandwidth (S801). In the case in which the current. PHY rate is maximum (that is, 36 Mbps) (No in S801), a process starting from S803 is carried out to select the appropriate PHY rate. Meanwhile, in the case in which the current PHY rate is not maximum (No in S801), the PHY rate is decreased by one level in the specific TXOP after a certain period of time, so as to decrease the error resilience (S802). After that, the process starting from S803 is carried out.

In S803, the error resilience managing section 106 confirms in reference to the table of FIG. 7, (i) a maximum transmission capacity Rmax[TM] at the current PHY rate and (ii) a maximum transmission capacity Rmax[TM+1] at the PHY rate that is one level lower than the current PHY rate. Next, in the error resilience managing section 106, the current transmission capacity R is obtained by the following equation (9) (S804).

$$R[TM]=R\max[TM]\times(1-PER/100) \qquad (9)$$

Note that the equation (9) is the same as the equation used for calculating the transmission capacity R in the encoding rate control.

After that, a comparison between the R obtained in S804 and the maximum transmission capacity Rmax[TM+1] at the PHY rate that is one level lower is carried out (S805). In the case in which the R is smaller than Rmax[TM+1] (Yes: in S805), the higher throughput can be realized by decreasing the PHY rate. Therefore, the PHY rate is decreased by one level (S806). Meanwhile, in the case in which R[TM] is equal to Rmax[TM+1] or R is larger than Rmax[TM+1], the higher throughput can be realized by the current PHY rate. Therefore, the PHY rate is not changed (S807).

Specifically, if the PHY rate and PER measured by the channel conditions measurement section 107 are 36 Mbps and 50%, respectively, in a certain TXOP, the transmission capacity at the PHY rate of 36 Mbps for the following TXOP may be 4.5 Mbps in accordance with $R=9\times(1-0.5)$. Meanwhile, in the case in which the PHY rate is one level lower than 36 Mbps, that is, 24 Mbps, the error resilience becomes strong. Therefore, the PER is improved and expected to be 0% (see FIG. 11). Therefore, Rmax[2]=6 Mbps (see FIG. 7). Therefore, under this situation, the error resilience managing section 106 judges that the higher throughput can be realized by the PHY rate of not 36 Mbps but 24 Mbps.

Which PHY rate can secure the higher transmission capacity is judged by the above-described process. Thus, it is possible to carry out the error resilience control which requires no feedback information specially created by the receiving station end, and realizes high reaction speed not only when the channel conditions deteriorate but also when the conditions recover.

Here, TXOP is used as the timescale for altering the PHY rate, but any timescale can be used as long as the time scale is sufficiently smaller than a predetermined period of time (here, 100 ms) for automatically increasing the PHY rate.

Moreover, the control of altering the PHY rate here is carried out in reference to the table, created in advance, of Rmax[TM], but the same control may be carried out in reference to only information of the packet error rate. For example, the threshold value of the packet error rate for changing the PHY rate from 24 Mbps to 12 Mbps is 12/24, that is, 0.5. In this case, when the packet error rate is 60% at the PHY rate of 24 Mbps, it is possible to predict that the higher transmission capacity can be secured by changing the PHY rate to 12 Mbps.

The transmitting device 201 of the present embodiment includes the HC function implementing section 7. Therefore, in the case in which the bandwidth is secured by HCCA, it is possible to find out how much of the bandwidth is secured. On this account, a table containing the maximum transmission capacity at each PHY rate in the above-described bandwidth is prepared in advance, and a method for referring to the table to judge which error resilience control is the most effective is used. In actual practice, however, another device may have the HC functions. When this is the case, the transmitting device 201 can freely transmit packets after it receives a packet indicating a grant of bandwidth. Thus, normally; this particular case can be handled in the same fashion as more general cases where the transmitting device 201 possess the HC functions.

However, if the channel conditions between the device with the HC functions and the transmitting device 201 deteriorate, the packet indicating a grant of bandwidth may not be received due to an error, which leads to only a small bandwidth allocated. To deal with such cases, if the device possessing the HC functions is separately provided from the transmitting device 201, the channel conditions measurement section 107 measures the communications bandwidth actually allocated in a predetermined period. Then, a table is prepared containing the maximum transmission capacity for each PHY rate on the assumption that the communications bandwidth is used up, the channel conditions are good, and the packet error rate is 0%. The table is updated every time the communications bandwidth is measured for use in the error resilience control. Thus, the invention can deal with the HC functions being possessed by a device other than the transmitting device 201.

Moreover, as mentioned earlier, it is preferable at present to carry out the control in view of the EDCA communications and the best-effort types of communications, in addition to the transmitting device which secures the bandwidth by HCCA to transmit the stream data. In these cases, the channel conditions measurement section 107, in a predetermined period, measures the bandwidth occupied by the transmitting device and the free bandwidth which is used by no communications devices. The sum of the durations will be considered as the bandwidth successfully secured by the transmitting device. Then, a table is prepared containing the maximum transmission capacity at the PHY rates on the assumption that the communications bandwidth is used up. The table is updated every time the communications bandwidth is measured for use in the error resilience control. Thus, the invention can deal with the EDCA communications and the best-effort types of communications.

Note that the error resilience control here is carried out at the PHY rate of 36 Mbps, 24 Mbps or 12 Mbps, but may be carried out at any PHY rate as long as the PHY rate is defined in IEEE802.11a. Moreover, other than the PHY rate control, a transmission method for applying the error-correcting code, such as a Read Solomon code and a turbo code, to data may be used.

The above control enables the error resilience control with high tracking capability not only when the channel conditions deteriorate, but also when the conditions recover. In addition, since the transmitting device 201 finds out the channel conditions, the receiving device 202 needs no mechanism which creates special feedback information.

As described above, the transmitting device 201 of the present embodiment carries out both the encoding rate control and the error resilience control, however the present invention is not limited to this, and the transmitting device 201 may carry out either one of the encoding rate control and the error resilience control. In the case in which the transmitting device 201 carries out only the encoding rate control, it is not necessary to provide the error resilience managing section 106 arranged as above, and a conventional error resilience managing section may be provided. Meanwhile, in the case in which the transmitting device 201 carries out only the error resilience control, it is not necessary to provide the encoding rate managing section 102 arranged as above, and a conventional encoding rate managing section may be provided.

The present invention is not limited to the description of the embodiments above, but may be altered by a skilled person within the scope of the claims. An embodiment based on a proper combination of technical means disclosed in different embodiments is encompassed in the technical scope of the present invention.

Note that the components included in the data transmitting section 1, i.e. the application 101, the encoding rate managing section 102, the encoding rate altering section 103, the error resilience adding section 105, the error resilience managing section 106, the channel conditions measurement section 107, and the communications section 108 is implemented by controlling a keyboard or other input means, a display or other output means, or an interface circuit or other communication means with a CPU or other compute means executing computer programs recorded in ROM (Read Only Memory), RAM, or other storage means. Therefore, the various functions and various process steps of the data transmitting section 1 are implemented by a computer equipped with the various means simply reading a storage medium containing the program for execution of the program. In addition, the various functions and process steps are implemented on a given computer by recording the program on a removable storage medium.

The storage medium may be a memory (not shown) for process steps on a microcomputer. For example, the program medium may be something like a ROM. Alternatively, the program medium may be such that a program reader device (not shown) as an external storage device may be provided in which a storage medium is inserted for reading.

In addition, in any case, the stored program is preferably executable on access by a microprocessor. Further, it is preferred if the program is retrieved, and the retrieved program is downloaded to a program storage area in a microcomputer to execute the program. The download program is stored in the transmitting device 201 in advance.

In addition, the program medium may be a storage medium constructed separably from a main body. The medium may be tape based, such as, a magnetic tape or cassette tape; disc based, such as a flexible disc or hard disk including a magnetic disc and CD/MO/MD/DVD; card based, such as an IC card (including a memory card); or a semiconductor memory, such as a mask ROM, EPROM (Erasable Programmable Read Only Memory), EEPROM (Electrically Erasable Programmable Read Only Memory), and a flash ROM. All these types of media hold the program in a fixed manner.

Further, the medium is preferably a storage medium which holds the program in a flowing manner so that the program can be downloaded over the communications network such as the Internet.

Further, if the program is downloaded over a communication network in this manner, it is preferred if the download program is either stored in the transmitting device 201 in advance or installed from another storage medium.

As described above, a communications device of the present invention may be a communications device which transmits encoded stream data to be transmitted in realtime, the device comprising: a transmission buffer for temporarily storing the stream data; a communications section which transmits the data stored in the transmission buffer to an external communications device; a channel conditions measurement section which measures channel conditions of the communications section, wherein the channel conditions measurement section measures transmission information and performs control in accordance with the measured information so that the realtime transmission is carried out without interruption. In the communications device of the present invention, the transmission information may be a transmission scheme, information on packet error rate in a predetermined time period, or the number of successfully transmitted packets and the number of unsuccessfully transmitted packets.

In such a communications device, in transmitting stream data required to be transmitted in realtime, such as video and audio, controls are performed on the basis of only information obtained inside the communications device. This eliminates the need for feedback information specially created by the receiving device at a receiving end of the stream data, and allows for controls with a high reaction speed in the situations where the channel conditions become deteriorated and where the channel conditions become good.

The foregoing communications device may be arranged so as to include: an encoding rate altering section which alters an encoding rate of the stream data; and an encoding rate managing section which manages the encoding rate of the encoding rate altering section, wherein the encoding rate managing section instructs alteration of the encoding rate in accordance with a measurement result of the channel conditions having been measured by the channel conditions measurement section. In this manner, the communications device performs the encoding rate control in accordance with a measurement result of a current channel conditions, so that it is possible to alleviate video disturbance.

The foregoing communications device may be arranged so as to include: an error resilience adding section which adds error resilience to the data stored in the transmission buffer; and an error resilience managing section which manages the error resilience adding section, wherein the error resilience managing section instructs alteration of the error resilience in accordance with a measurement result of the channel conditions having been measured by the channel conditions measurement section. In this manner, the communications device performs the error resilience control in accordance with a measurement result of a current channel conditions, so that it is possible to alleviate video disturbance.

The foregoing communications device may be arranged so as to include: an encoding rate altering section which alters an encoding rate of the stream data; an encoding rate managing section which manages the encoding rate of the encoding rate altering section; an error resilience adding section which adds error resilience to the data stored in the transmission buffer; and an error resilience managing section which manages the error resilience adding section, wherein: in accordance with a measurement result of the channel conditions having been measured by the channel conditions measurement section, the encoding rate managing section instructs alteration of the encoding rate, and the error resilience managing section instructs alteration of the error resilience. In this manner, the communications device performs the encoding rate control and the error resilience control in accordance with a measurement result of a current channel conditions, so that it is possible to alleviate video disturbance.

Further, the communications device of the present invention is preferably arranged such that the encoding rate managing section sets a maximum value of stored information in the transmission buffer (queue size) and selects an encoding rate such that the queue size is below the maximum value after a given time period elapsed from the encoding rate setting.

Thus, the communications device enables packets up to a given queue size to be stored in the transmission buffer. This makes it possible to hold a high encoding rate when the communications environment is deteriorated temporarily.

Still further, the communications device of the present invention is preferably arranged such that the channel conditions measurement section acquires channel conditions of the communications section and the encoding rate managing section assumes that the channel conditions can deteriorate at any time. In this manner, the communications device controls the encoding rate, assuming that future channel conditions will deteriorate at any time. This allows for stream data transfer without the occurrence of video disturbance even when the channel conditions are actually deteriorated rapidly.

Yet further, the communications device of the present invention is preferably arranged in the following manner: The channel conditions measurement section collects and stores (i) a PHY rate used in a given time period by the communications section and (ii) a PER in the given time period, As a result of the same measurement performed subsequently, if judging that communications environment is worse, the channel conditions measurement section updates a combination of PHY rate and PER. Thereafter, the same steps are repeated.

In this manner, the communications device enables storage of the PHY rate and PER in the worst-ever communications environment. The communications device controls the encoding rate, predicting that this worst communications environment can occur at any time. This allows for stream data transfer without the occurrence of video disturbance when the channel conditions are actually deteriorated rapidly.

The communications device of the present invention may be arranged such that the encoding rate managing section is able to set a maximum value and/or a minimum value of the encoding rate and instructs alteration of the encoding rate within a range of the maximum value and the minimum value of the encoding rate. Thus, with the setting of the maximum value for the encoding rate control, it is possible to avoid (i) occupation of a communications bandwidth more than necessary due to the setting of a stream data encoding rate that would bring a quality more than required and (ii) the condition where video disturbance is likely to occur when the communications environment is deteriorated. In addition, with the setting of the minimum value for the encoding rate control, it is possible to secure a minimum quality.

The communications device of the present invention may be arranged such that the channel conditions measurement section collects information on transmission scheme (specifically, PHY rate, transmission scheme that applies, to data, error correcting code such as Read Solomon code or turbo code, or the like) used in the communications section, and the error resilience managing section instructs alteration of the error resilience in accordance with the collected information. In this manner, by collecting information on currently used transmission scheme, it is possible to accurately grasp current channel conditions.

The communications device of the present invention may be arranged such that the error resilience adding section designates a transmission scheme to the data stored in the transmission buffer for stream data transmission via the communications section, and the error resilience managing section sets a transmission scheme for use and instructs alteration of the error resilience by controlling the transmission scheme, in accordance with the measurement result of the channel conditions.

Thus, with alteration of an added error resilience, it is possible to alter the settings of transmission scheme (e.g. decrease of PHY rate) when the channel conditions are deteriorated, for improvement in throughput. Further, with the setting of a maximum PHY rate, it is possible to avoid decrease of a stably communicable range caused by an excessively low error resilience due to increase of the PHY rate. With the setting of a minimum PHY rate, it is possible to avoid decrease of throughput caused by the error resilience higher than necessary due to decrease of the PHY rate.

The communications device of the present invention may be arranged such that the channel conditions measurement section measures the information on transmission scheme used in the communications section and then calculates a transmission capacity using the information on transmission scheme.

The communications device of the present invention may be arranged such that the channel conditions measurement section measures, (i) the information on transmission scheme used in the communications section and (ii) a communications bandwidth allocated for a predetermined time period, and then calculates a transmission capacity using the information on transmission scheme and the information on communications bandwidth.

The communications device of the present invention may be arranged such that the channel conditions measurement section measures (i) the information on transmission scheme used in the communications section and (ii) a free bandwidth and an occupied bandwidth occupied by the communications device for a predetermined time period, and then calculates a transmission capacity using the information on transmission scheme and the information on occupied bandwidth and free bandwidth.

The communications device of the present invention may be arranged such that the channel conditions measurement section calculates a transmission capacity using information on the amount of successfully transmitted data.

The communications device of the present invention may be arranged such that the transmission scheme is whether or not the data stored in the transmission buffer is divided into smaller pieces of data, or a type of size of the division.

The communications device of the present invention may be such that the error resilience adding section uses at least one of the foregoing transmission schemes. The communications device of the present invention may be such that the transmission capacity is a maximum throughput that is implementable in a predetermined time period with the transmission scheme used by the error resilience adding section.

Further, the communications device of the present invention is preferably arranged such that the channel conditions measurement section measures information on PHY rate used in the communications section, and calculates a transmission capacity using the measured information on PHY rate. With this arrangement, in the situation where the HC and the communications device are identical in configuration, and a bandwidth is secured under the HCCA, it is possible to calculate a transmission capacity only by measuring a currently used PHY rate.

Still further, the communications device of the present invention is preferably arranged such that the channel conditions measurement section measures (i) information on PHY rate used in the communications section and (ii) a communications bandwidth allocated in a predetermined time period and calculates a transmission capacity using the measured information on PHY rate and information on communications bandwidth. With this arrangement, in the situation where the HC and the communications device are identical in configuration, and a bandwidth is secured under the HCCA, it is possible to calculate a transmission capacity only by measuring a currently used PHY rate and a bandwidth actually allocated from the HC.

Yet further, the communications device of the present invention is preferably arranged such that the channel conditions measurement section measures (i) information on PHY rate used in the communications section and (ii) a free bandwidth and a bandwidth occupied by the communications device for a predetermined time period, and calculates a transmission capacity using the measured information on PHY rate and information on free bandwidth and occupied bandwidth.

With this arrangement, in the situation where transmission of stream data is carried out through the EDCA communications or the best-effort type communications measurement of a free bandwidth, it is possible to calculate a transmission capacity by measuring a bandwidth actually used by the communications device, and a PHY rate.

According to the present invention, the communications device measures current channel conditions and then performs the encoding rate control and/or the error resilience control on the basis of a result of the measurement. This eliminates the need for feedback information specially created by the receiving device at a receiving end of the stream data, and thus allows for construction of a communications system which needs no extra circuit configuration of the receiving device. Further, the communications device calculates a maximum transmission capacity with respect to the channel conditions from information such as a PHY rate, and performs the encoding rate control and/or the error resilience control using the information and packet error rate. This makes it possible to perform the encoding rate control and/or the error resilience control each of which allows high reaction speed with respect to variation of a communications environment. In a case of using the encoding rate control when the communications environment is deteriorated, the amount of stream, data supplied is reduced to alleviate video disturbance. In a case of using the error resilience control, control for improvement in throughput is performed to alleviate video disturbance.

A concurrent use of the encoding rate control and the error resilience control, allows not only further alleviation of video disturbance but also reduction of the amount of data required to be stored in the transmission buffer of the communications device, as compared with a single use of either the encoding rate control or the error resilience control. This prevents increase in cost. Also, with the encoding rate control, in a deteriorated channel conditions, it is possible to realize video image of high quality by storing data in the transmission buffer to an allowable amount without reducing the amount of stream data supplied. It is difficult to predict rapid deterioration of the channel conditions. Therefore, in the encoding rate control, the communications device always assumes that channel conditions will become worse than the current channel conditions. Alternatively, the communications device store the worst ever channel conditions in advance so as to always assumes that the worst ever channel conditions will occur. This makes it possible to alleviate video disturbance even when rapid deterioration of the channel conditions occurs. These controls allows calculation of a transmission, capacity with respect to channel conditions not only in the situation where a bandwidth is secured under HCCA, but also in the EDCA communications or best-effort type communications. Therefore, these controls can be used in every communications device.

As described above, the communications device of the present invention is a communications device which transmits stream data to an external communications device via a communications medium through packet communications, the communications device comprising: an encoding rate altering section which alters an encoding rate of the stream data; and an encoding rate managing section which controls alteration of the encoding rate, wherein: the encoding rate managing section determines the encoding rate in accordance with information on valid period of the stream data.

As described above, the communications method of the present invention is a communications method for transmitting stream data to an external communications device via a communications medium through packet communications, the communications method comprising: an encoding rate altering step of altering an encoding rate of the stream data; and an encoding rate managing step of controlling alteration of the encoding rate, wherein: in the encoding rate managing step, the encoding rate is determined in accordance with information on valid period of the stream data.

Here, the "valid period of the stream data" is a time limit within which the stream data transmitted from the communications device at a transmitting end must be reproduced at a receiving station.

In the above arrangement and method, the transmitting station has the information on valid period of the stream data, so that it is possible to change a behavior for the encoding rate control according to the valid period of the stream data in the following manners: If the valid period is relatively long, the transmitting station performs controls after observing the conditions of a radio channel for a while. In contrast, if the valid period is relatively short, the encoding rate is rapidly decreased with degradation of the wireless channel.

The communications device of the present invention may be such that the encoding rate determining section determines the encoding rate in accordance with information on delay time (Tdelay) until the encoding rate altering section actually alters the encoding rate after the encoding rate determining section instructs the encoding rate altering section to alter the encoding rate.

Further, the communications, device of the present invention, as described above, is a communications device which transmits stream data to an external communications device via a communications medium through packet communications, the communications device comprising: an encoding rate altering section which alters an encoding rate of the stream data; and an encoding rate managing section which controls alteration of the encoding rate, the encoding rate managing section including an encoding rate determining section which determines the encoding rate in accordance with information on delay time until the encoding rate altering section actually alters the encoding rate after the encoding rate determining section instructs the encoding rate altering section to alter the encoding rate.

Still further, the communications method of the present invention is a communications method for transmitting stream data to an external communications device via a communications medium through packet communications, the communications method comprising: an encoding rate altering step of altering an encoding rate of the stream data; and an encoding rate managing step of controlling alteration of the encoding rate, wherein: in the encoding rate managing step, the encoding rate is determined in accordance with information on delay time until the encoding rate is actually altered in the encoding rate altering step after a receipt of encoding rate alteration instruction in the encoding rate altering step.

In the above arrangement and the method, in the encoding rate altering step, the transmitting station grasps a maximum delay time until the encoding rate is actually altered in the encoding rate altering step after a receipt of encoding rate alteration instruction. Therefore, considering at all times that the encoding rate is not altered during the maximum delay time, it is possible to perform an appropriate encoding rate control even when the encoding rate is not actually altered during the delay time.

In addition to the above arrangement, the communications device of the present invention further includes: a transmission buffer which temporarily stores data to be transmitted; and a channel conditions measurement section which measures channel conditions in the communications medium, the encoding rate managing section further including: a transmission capacity calculating section which calculates a transmission capacity of packets transmitted in a predetermined time period, in accordance with the channel conditions having been measured by the channel conditions measurement section, wherein: the encoding rate determining section determines the encoding rate in accordance with the calculated transmission capacity and an amount of data stored in the transmission buffer, as well as the information on valid period of the stream data.

The communications device of the present invention may be such that the encoding rate determining section predicts that a future transmission capacity (Rp) will be lower than the current transmission capacity (R) at any time, and determines the encoding rate in accordance with the predicted future transmission capacity.

In addition to the above arrangement, the communications device of the present invention may be such that the encoding rate managing section further include a transmission capacity memory section which stores the transmission capacity calculated by the transmission capacity calculating section, and the encoding rate determining section determines the encoding rate in accordance with past transmission capacities stored in the transmission capacity memory section and the amount of data stored in the transmission buffer.

In addition to the above arrangement, the communications device of the present invention may be such that the amount of data stored in the transmission buffer is a predicted amount of data that can be stored in the transmission buffer.

Yet further, the communications device of the present invention, as previously described, may be a communications device which transmits stream data to an external communications device via a communications medium through packet communications, the communications device comprising: a channel conditions measurement section which measures channel conditions in the communications medium; an encoding rate altering section which alters an encoding rate of the stream data; and an encoding rate managing section which controls alteration of the encoding rate, the encoding rate managing section including: a transmission capacity calculating section which calculates a transmission capacity of packets transmitted in a predetermined time period, in accordance with the channel conditions having been measured by the channel conditions measurement section; and an encoding rate determining section which predicts that the transmission capacity will be lowered at any time in future, and then determines the encoding rate in accordance with the predicted transmission capacity.

Further, the communications method of the present invention, as previously described, may be a communications method for transmitting stream data to an external communications device via a communications medium through packet communications, the communications method comprising: a channel conditions measurement section which measures channel conditions in the communications medium; an encoding rate altering step of altering an encoding rate of the stream data; and an encoding rate managing step of controlling alteration of the encoding rate, wherein: in the encoding rate managing step, after a transmission capacity of packets transmitted in a predetermined time period is calculated in accordance with the channel conditions having been measured in the channel conditions measurement step, it is predicted that the transmission capacity will be lowered at any time in future, and the encoding rate is determined in accordance with the predicted transmission capacity.

In the above arrangement and method, a transmission capacity of packets transmitted in a predetermined time period is calculated in accordance with the channel conditions having been measured by the channel conditions measurement section, and the encoding rate is determined predicting that the transmission capacity will be lowered at any time. Here, the transmission capacity is the amount of transmittable data per unit time (also referred to as throughput) under the channel conditions measured in a predetermined time period. Therefore, with calculation of the transmission capacity, it is possible to recognize the predicted amount of data successfully transmitted to the receiving end; Additionally, it is possible to use the transmission capacity as an indicator for the channel conditions. Here, "predicting that the transmission capacity will be lowered at any time" is, for example, predicting that the transmission capacity will be lowered at any time to one third of a current transmission capacity immediately after measurement of the current transmission capacity. In other words, predicting that the transmission capacity will be lower than a current transmission capacity at any time makes it possible to suppress the occurrence of video disturbance when the transmission capacity is actually lowered.

Yet further, the communications device of the present inventions as previously described, may be a communications device which transmits stream data to an external communications device via a communications medium through packet communications, the communications device comprising: a channel conditions measurement section which measures channel conditions in the communications medium; an encoding rate altering section which alters an encoding rate of the stream data; and an encoding rate managing section which controls alteration of the encoding rate, the encoding rate managing section including: a transmission capacity calculating section which calculates a transmission capacity of packets transmitted in a predetermined time period, in accordance with the channel conditions having been measured by the channel conditions measurement section; a transmission capacity memory section which stores the transmission capacity calculated by the transmission capacity calculating section; and an encoding rate determining section which determines an encoding rate in accordance with past transmission capacity histories stored in the transmission capacity memory section.

Further, the communications method of the present invention, as previously described, may be a communications method for transmitting stream data to an external communications device via a communications medium through packet communications, the communications method comprising: a channel conditions measurement step of measuring channel conditions in the communications medium; an encoding rate altering step of altering an encoding rate of the stream data; and an encoding rate managing step of controlling alteration of the encoding rate, wherein: in the encoding rate managing step, after a transmission capacity of packets transmitted in a predetermined time period is calculated in accordance with the channel conditions having been measured in the channel conditions measurement step, the calculated transmission capacity is stored, and the encoding rate is determined in accordance with past transmission capacity histories stored.

In the above arrangement and method, a transmission capacity of packets transmitted in a predetermined time period is calculated in accordance with the channel conditions having been measured by the channel conditions measurement section, the calculated transmission capacity is stored, and the encoding rate is determined in accordance with past transmission capacity histories stored. Here, the transmission capacity is the amount of transmittable data per unit time (also referred to as throughput) under the channel conditions measured in a predetermined time period. Therefore, with calculation of the transmission capacity, it is possible to recognize the predicted amount of data successfully transmitted to the receiving end. Additionally, it is possible to use the transmission capacity as an indicator for the channel conditions. Here, the "past transmission capacity histories" mean, for example, transmission capacities stored at any time within few seconds (specifically, 1 second) immediately before the encoding rate determining section determines a next encoding rate. In other words, by checking the past transmission capacity histories, it is possible to predict a future channel conditions, especially the extent to which channel conditions will be deteriorated in future.

Conventionally, as previously described, the transmitting device altered the encoding rate in accordance with the information on channel conditions having been measured by and received from the receiving device. In such an arrangement, under deteriorated channel conditions, there was the problem of a delay in altering the encoding rate due to a failed reception of the information on the channel conditions transmitted from the receiving device. Additionally, there was the problem of requiring the receiving device to be equipped with means which measures channel conditions and then transmits information on the channel conditions to the transmitting device.

On the contrary, according to the above arrangement and method, the encoding rate settings are controlled in accordance with the channel conditions having been measured by the communications device at the transmitting end. This eliminates the need for feedback information specially created by the communications device at a receiving end, and thus allows for promptly tracking variation of the communications environment. In addition, by controlling the encoding rate settings in accordance with a predicted transmission capacity lower than the current transmission capacity, or in accordance with past transmission capacity histories, it is possible to perform controls based on the assumption that the channel conditions will be deteriorated. This allows for alleviation of communications disturbance caused in rapidly deteriorated channel conditions.

As previously described, the communications device of the present invention is a communications device which performs packet communications to an external communications device via a communications medium, the communications device comprising: a channel conditions measurement section which measures channel conditions in the communications medium; an error resilience adding section which adds error resilience to packets to be transmitted; and an error resilience managing section which controls the error resilience added by the error resilience adding section, wherein: the error resilience managing section calculates a packet error rate of packets transmitted in a predetermined time period in accordance with the channel conditions having been measured by the channel conditions measurement section, and performs controls so as to (i) alter the error resilience to a higher error resilience if the packet error rate is not less than a threshold value and to (ii) lower the error resilience regardless of the channel conditions having been measured by the channel conditions measurement section if a predetermined time period has elapsed without alteration of the error resilience.

As previously described, the communications method of the present invention is a communications method for performing packet communications with respect to an external communications device via a communications medium, the communications method comprising: a channel conditions measurement step of measuring channel conditions in the communications medium; an error resilience adding step of adding error resilience to packets to be transmitted; and an error resilience managing step of controlling the error resilience added in the error resilience adding step, wherein: in the error resilience managing step, a packet error rate of packets transmitted in a predetermined time period is calculated in accordance with the channel conditions having been measured in the channel conditions measurement step, and controls are performed in such a manner that (i) the error resilience is altered to a higher error resilience if the packet error rate is not less than a threshold value and that (ii) the error resilience is lowered regardless of the channel conditions having been measured in the channel conditions measurement step if a predetermined time period: has elapsed without alteration of the error resilience.

In the above arrangement and method, a packet error rate of packets transmitted in a predetermined time period is calculated in accordance with the channel conditions having been measured by the channel conditions measurement section.

Therefore, if the packet error rate increases, it is predicted that the channel conditions is deteriorated. In the above arrangement and method, if the calculated packet error rate is not less than a threshold value, controls are performed to alter the error resilience to a higher one. On the other hand, if a predetermined time period has elapsed without alteration of the error resilience, controls are performed to lower the error resilience regardless of the channel conditions.

Thus, according to the above arrangement and method, the error resilience control is performed in accordance with the channel conditions having been measured by the communications device at the transmitting end. This eliminates the need for feedback information specially created by the communications device at a receiving end of the stream data, and thus allows for promptly tracking variation of the communications environment. By performing control, for higher error resilience by using increase in packet error rate as an index indicating deterioration of the channel conditions, it is possible to perform the control with the current channel conditions grasped accurately. Further, by performing control for lower error resilience regardless of the channel conditions if a predetermined time period has elapsed without alteration of the error resilience, a prompt tracking with respect to the recovery of the channel conditions is possible.

In addition to the above arrangement, the communications device of the present invention may further includes: an error resilience adding section which adds error resilience to packets to be transmitted; and an error resilience managing section which controls the error resilience added by the error resilience adding section, wherein: the error resilience managing section calculates a packet error rate of packets transmitted in a predetermined time period in accordance with the channel conditions having been measured by the channel conditions measurement section, and performs controls so as to (i) alter the error resilience to a higher error resilience if the packet error rate is not less than a threshold value and to (ii) lower the error resilience regardless of the channel conditions having been measured by the channel conditions measurement section if a predetermined time period has elapsed without alteration of the error resilience.

According to the above arrangement, not only the encoding rate of the stream data is determined in accordance with the channel conditions having been measured by the channel conditions measurement section, but also the error resilience granted to packets to be transmitted is altered according to the calculated packet error rate of packets transmitted in a predetermined time period. Therefore, measurement of the channel conditions is performed without delay in the communications device at the transmitting end. In accordance with a result of the measurement, the encoding rate and the error resilience are altered. This makes it possible to perform the encoding rate control and the error resilience control each of which allows a prompt tracking with respect to variation of channel conditions, and thus allows further alleviation, of video disturbance. As compared to the use of determination of the encoding rate and the error resilience control in isolation from each other, the amount of data required to be temporarily stored in the transmission buffer of the communications device can be reduced. This prevents increase in cost.

The communications device of the present invention is preferably arranged such that the encoding rate determining section determines the encoding rate in accordance with a worst transmission capacity of the past transmission capacities stored in the transmission capacity memory section, the worst transmission capacity being a lowest transmission capacity.

According to the above arrangement, the encoding rate is determined in accordance with the worst transmission capacity of the past transmission capacity histories stored in the transmission capacity memory section. This allows the encoding rate to be controlled, assuming that the worst communications environment will occur at any time. This allows for transmission of stream data without the occurrence of video disturbance even when channel conditions are rapidly deteriorated. Note that, specifically, the worst transmission capacity is the lowest transmission capacity of the past transmission capacities stored.

The communications device of the present invention preferably further includes: a transmission buffer which temporarily stores data to be transmitted, wherein: the encoding rate determining section determines an encoding rate in accordance with an predicted amount of data to be stored in the transmission buffer when the worst transmission capacity has continued for a predetermined time period.

According to the above arrangement, the encoding rate is controlled so that a predicted amount of data to be stored in the transmission buffer is not exceeded when the worst transmission capacity has continued for a predetermined time period. With this arrangement, under temporary deteriorated communications environment, when there is enough space in the transmission buffer because data are not stored so much in the transmission buffer, it is possible to maintain a high encoding rate. In other words, under temporary deteriorated channel conditions, it is possible to realize high-quality video data by storing data in the transmission buffer to an allowable amount without reducing the amount of stream data supplied.

The communications device of the present invention is preferably arranged such that the encoding rate determining section controls sets the encoding rate to at least one of a maximum encoding rate and a minimum encoding rate.

According to the above arrangement, the encoding rate is controlled within a range of a maximum encoding rate and a minimum encoding rate. Thus, it is possible to set a maximum encoding rate. This makes it possible to prevent a communications bandwidth from being occupied more than necessary due to setting to the encoding rate higher than required for communications quality, and to prevent transmission failures from frequently occurring under a deteriorated communications environment. Moreover, it is possible to set the minimum encoding rate. This secures a minimum communications quality.

The communications device of the present invention is preferably arranged such that the encoding rate altering section alters the encoding rate of the stream data to (a) an encoding rate determined by the encoding rate determining section or (b) an encoding rate that is nearest to the encoding rate (a) among a plurality of encoding rates for encoding of the same stream data.

According to the above arrangement, even a device not having the function of altering the encoding rate exactly to an encoding rate (a) determined by the encoding, rate determining section during stream data transmission, can select stream data whose encoding rate is nearest to the encoding rate (a) for its transmission among a plural sets of stream data which are prepared in advance and whose encoding rates are different from one another. This brings about the same effect obtained by stream data communications with alteration of the encoding rate.

In addition to the above arrangement, the communications device of the present invention is preferably arranged so as to further include: a communications section which serves as a physical layer in performing data transmission via the communications medium, wherein: the channel conditions measurement section measures a physical layer communications speed and a packet error rate, the physical layer communications speed being set by the physical layer of the communications section, and the encoding rate managing section and/or the error resilience managing section calculates the transmission capacity in accordance with the physical layer communications speed and the packet error rate both of which are measured by the channel conditions measurement section.

According to the above arrangement, the encoding rate managing section and/or the error resilience managing section can accurately calculate a current transmission capacity in accordance with the physical layer communications speed and the packet error rate both of which have been measured by the channel conditions measurement section.

In addition to the above arrangement, the communications device of the present invention is preferably arranged so as to further include: a table memory section which stores a table representing a relationship between the physical layer communications speed and a maximum transmission capacity that is transmittable within a predetermined time period, wherein: the encoding rate managing section and/or the error resilience managing section acquires a maximum transmission capacity, from the table, corresponding to the physical layer communications speed having been measured by the channel conditions measurement section, and then calculates the transmission capacity in accordance with the acquired maximum transmission capacity and the packet error rate having been measured by the channel conditions measurement section.

According to the above arrangement, the encoding rate managing section and/or the error resilience managing section can easily acquire the corresponding maximum transmission capacity from the table. This allows the transmission capacity to be calculated in a short time.

In addition to the above arrangement, the communications device of the present invention is preferably arranged such that the channel conditions measurement section further measures a communications bandwidth allocated to said communications device for a predetermined time period, and the encoding rate managing section and/or the error resilience managing section calculates the transmission capacity in accordance with information on the physical layer communications speed and the communications bandwidth.

According to the above arrangement, the transmission capacity is calculated in accordance with information on the communications bandwidth allocated to the communications device for a predetermined time period as well as the physical layer communications speed. Therefore, in the situation where there occur deteriorated communications conditions with an external communications control device by which a bandwidth is allocated to the communications device, even when a bandwidth allocated to the communications device decreases, the communications device is able to calculate a transmission capacity in accordance with the actually allocated bandwidth. Therefore, it is possible to predict a transmission capacity with higher accuracy.

The communications device of the present invention is preferably arranged such that the channel conditions measurement section further measures a free bandwidth and an occupied bandwidth occupied by said communications device for a predetermined time period, and the encoding rate managing section and/or the error resilience managing section calculates the transmission capacity in accordance with the physical layer communications speed and information on the occupied, bandwidth and the free bandwidth.

According to the above arrangement, the transmission capacity is calculated in accordance with information on the free bandwidth and the bandwidth occupied by the communications device for a predetermined time period as well as the physical layer communications speed. Therefore, it is possible to more accurately calculate the transmission capacity even when communications where a transmission right is granted at random are performed.

The communications device of the present invention is preferably arranged such that the encoding rate managing section calculates the transmission capacity in accordance with an amount of successfully transmitted data which is measured by the channel conditions measurement section.

According to the above arrangement, the transmission capacity is calculated from only information on the amount of successfully transmitted data. This eliminates the need for the physical layer communications speed, packet error rate, table and other information and the need for consideration given to the allocated bandwidth, the occupied bandwidth, and the free bandwidth. This allows for easy calculation of the transmission capacity and high suitability to a wide variety of devices.

The communications device of the present invention is preferably arranged such that the error resilience managing section calculates a current transmission capacity in accordance with the packet error rate having been measured by the channel conditions measuring section, compares between the current transmission capacity and a maximum transmission capacity that is transmittable at the higher error resilience, and then performs control for strengthening of the error resilience if the current transmission capacity is below the maximum transmission capacity at the higher error resilience.

According to the above arrangement, in the case when the current transmission capacity calculated in accordance with the packet error rate is lower than a maximum transmission capacity that is transmittable at the higher error resilience, the error resilience is altered to higher error resilience. Here, "the case when the current transmission capacity calculated is lower than a maximum transmission capacity that is transmittable at the higher error resilience" means a state where the transmission capacity transmitted under the current channel conditions is low and the current channel conditions are not so good. Additionally, the above case indicates that even in the situation where communications bandwidth is narrowed, strengthening the error resilience increases the transmission capacity, and thus enables excellent communications. Therefore the above-mentioned control allows for an unerring recognition that the current channel conditions are in a state where the error resilience should be strengthened, and control of the error resilience. In such an error resilience control, from no alteration of the error resilience, it is judged that the channel conditions are good.

In the communications device of the present invention, the error resilience managing section preferably performs control so as to lower the error resilience when a predetermined time period has elapsed without alteration of the error resilience.

Generally, strengthening the error resilience and increasing the communications bandwidth are in a trade-off relation. If the error resilience is strengthened when the channel conditions are good, the communication bandwidth is decreased carelessly, which is not preferable. In addition, even in the case when the error resilience is lowered because the channel conditions are good with the error resilience in use, this does not always mean that the channel conditions are good. Therefore, it is difficult to judge whether lowering the error resilience increases the transmission capacity.

According to the above arrangement, when a predetermined time period has elapsed without alteration of the error resilience, it is possible to easily perform control for increasing communications bandwidth by lowering the error resilience regardless of the channel conditions. If the channel conditions temporarily deteriorate when the error resilience is lowered, the foregoing control for strengthening the resilience allows the error resilience to be quickly strengthened. This allows the transmission capacity to be highly maintained without decrease of the whole transmission capacity.

In addition to the above arrangement, the communications device of the present invention is preferably arranged so as to further include: a communications section which serves as a physical layer in performing, data transmission via the communications medium, wherein: the error resilience managing section controls the error resilience by altering a physical layer communications speed set by the physical layer of the communications section.

According to the above arrangement, decrease of the physical layer communications speed significantly improves the error resilience, so that it is possible to perform prompt and reliable error resilience control by altering the physical layer communications speed.

The communications device of the present invention is preferably arranged such that the error resilience managing section controls the error resilience by instructing the error resilience adding section to alter an encoding scheme and/or an encoding parameter of an error correcting code.

In the above arrangement, the encoding scheme of the error correcting code is equivalent to, for example, the modulation scheme of error correcting code, which will be described later. The encoding parameter is equivalent to, for example, an encoding ratio, as will be described later. According to the above arrangement, the error resilience is altered by alteration of the encoding scheme and/or the encoding parameter of the error correcting code. This allows for a reliable error resilience control.

Further, as described above, the communications device of the present invention is a communications device which transmits stream data to an external receiving device via a plurality of relay stations through packet communications, the communications device comprising: an encoding rate altering section which alters an encoding rate of the stream data; and an encoding rate managing section which controls alteration of the encoding rate, wherein: the encoding rate managing section compares between a total amount of data transmitted from said communications device and a total amount of data received by the receiving device so as to predict amounts of data stored in the transmission buffer of said communications device and transmission buffers of the respective relay stations, and determines the encoding rate in accordance with the predicted amounts of stored data and the total amount of data received by the receiving device.

In order to solve the above problem, the communications method of the present invention is a communications method for transmitting stream data from a communications device to an external receiving device via a plurality of relay stations through packet communications, the communications method comprising: an encoding rate altering step of altering an encoding rate of the stream data; and an encoding rate managing step of controlling alteration of the encoding rate, wherein: in the encoding rate managing step, comparison is performed between a total amount of data transmitted from the communications device and a total amount of data received by the receiving device so as to predict amounts of data stored in the transmission buffer of said communications device and transmission buffers of the respective relay stations, and the encoding rate is determined in accordance with the predicted amounts of stored data and the total amount of data received by the receiving device.

According to the above arrangement and method, the encoding rate control of the present invention becomes applicable to the Internet and mobile phone networks which include multiple relay stations between the communications device and the receiving device. Further, none of the receiving device and the relay stations needs to be equipped with a mechanism which creates special feedback information for the adjustment of the encoding rate.

(Supplementary Explanations)

Also, an object of the present invention is to provide (i) a communications device that needs no feedback from the receiving station when transmitting real-time stream data under various channel conditions and communication settings, and that alleviates the communications disturbance by applying, to the transmitting station, (a) the translation control (i.e. encoding rate setting control) and/or (b) the error resilience control allowing high reaction speed with respect to the variation of the communications environment; (ii) a communications method; (iii) a communications program; (iv) a storage medium storing the communications program; and (v) a communications system.

In order to achieve the above object, the communications device of the present invention may be a communications device which transmits stream data required to be transmitted in realtime, to an external communications device via a communications medium through packet communications, the communications device comprising: an encoding rate altering section which alters an encoding rate of the stream data; and an encoding rate managing section which controls alteration of the encoding rate, wherein: the encoding rate managing section determines the encoding rate in accordance with information on valid period of the stream data.

Further, in order to achieve the above object, the communications method of the present invention may be a communications method for transmitting stream data required to be transmitted in realtime, to an external communications device via a communications medium through packet communications, the communications method comprising: an encoding rate altering step of altering an encoding rate of the stream data; and an encoding rate managing step of controlling alteration of the encoding rate, wherein: in the encoding rate managing step, the encoding rate is determined in accordance with information on valid period of the stream data.

In addition to the above arrangement, the communications device of the present invention may be arranged so as to further include: a transmission buffer which temporarily stores data to be transmitted; and a channel conditions measurement section which measures channel conditions in the communications medium, the encoding rate managing section including: a transmission capacity calculating section which calculates a transmission capacity of packets transmitted in a predetermined time period, in accordance with the channel conditions having been measured by the channel conditions measurement section; and an encoding rate determining section which predicts the amount of data that can be stored in the transmission buffer in accordance with information on valid period of the data stream, and determines the encoding rate in accordance with the predicted amount of data.

In addition to the above arrangement, the communications device of the present invention may be arranged so as to further include a transmission capacity memory section which stores the transmission capacity having been calculated by the transmission capacity calculating section, and the encoding rate determining section which predicts the amount of data that can be stored in the transmission buffer in accordance with (i) past transmission capacities stored in the transmission capacity memory section and (ii) the information on valid period of the stream data, and then determines the encoding rate in accordance with the predicted amount of data.

Still further, in order to achieve the above object, the communications device of the present invention may be a communications device which transmits stream data required to be transmitted in realtime, to an external communications device via a communications medium through packet communications, the communications device comprising: a channel conditions measurement section which measures channel conditions in the communications medium; an encoding rate altering section which alters an encoding rate of the stream data; and an encoding rate managing section which controls alteration of the encoding rate, the encoding rate managing section including: a transmission capacity calculating section which calculates a transmission capacity of packets transmitted in a predetermined time period, in accordance with the channel conditions having been measured by the channel conditions measurement section; a transmission capacity memory section which stores the transmission capacity having been calculated by the transmission capacity calculating section; and an encoding rate determining section which determines an encoding rate in accordance with past transmission capacity histories stored in the transmission capacity memory section.

Yet further, in order to solve the above problem, the communications method of the present invention is a communications method for transmitting stream data required to be transmitted in realtime, to an external communications device via a communications medium through packet communications, the communications method comprising: a channel conditions measurement step of measuring channel conditions in the communications medium; an encoding rate altering step of altering an encoding rate of the stream data; and an encoding rate managing step of controlling alteration of the encoding rate, wherein: in the encoding rate managing step, a transmission capacity of packets transmitted in a predetermined time period is calculated in accordance with the channel conditions having been measured in the channel conditions measurement step, the calculated transmission capacity is stored, and then an encoding rate is determined in accordance with past transmission capacity histories stored.

In the above arrangement and method, a transmission capacity of packets transmitted in a predetermined time period is calculated in accordance with the channel conditions having been measured by the channel conditions measurement section, the calculated transmission capacity is stored, and the encoding rate is determined in accordance with past transmission capacity histories stored. Here, the transmission capacity is the maximum number of packets transmittable under the channel conditions having been measured in a predetermined time period. Therefore, with calculation of the transmission capacity, it is possible to recognize the maximum number of packets predictably successfully transmitted to the receiving end. Additionally, it is possible to use the transmission capacity as an indicator for the channel conditions. Here, the "past transmission capacity histories" mean, for example, transmission capacities stored at any time within few seconds (specifically, 1 second) immediately before the encoding rate determining section determines a next encoding rate. In other words, by checking the past transmission capacity histories, it is possible to predict a future channel conditions, especially the extent to which channel conditions will be deteriorated in future.

According to the above arrangement and method, the encoding rate settings are controlled in accordance with the channel conditions having been measured by the communications device at the transmitting end. This eliminates the need for feedback from the communications device at a receiving end, and thus allows for promptly tracking variation of the communications environment. In addition, by controlling the encoding rate settings in accordance with past transmission capacity histories, it is possible to perform controls based on the assumption that the channel conditions will be deteriorated. This allows for alleviation of communications disturbance caused in rapidly deteriorated channel conditions.

In order to achieve the above object, the communications device of the present invention is a communications device which transmits stream data required to be transmitted in realtime, to an external communications device via a communications medium through packet communications, the communications device comprising: a channel conditions measurement section which measures channel conditions in the communications medium; an error resilience adding section which adds error resilience to packets to be transmitted; and an error resilience managing section which controls the error resilience added by the error resilience adding section, wherein: the error resilience managing section calculates a transmission capacity of packets transmitted in a predetermined time period in accordance with the channel conditions having been measured by the channel conditions measurement section, and performs controls so as to (i) alter the error resilience to a higher error resilience if the transmission capacity is below a threshold value and to (ii) lower the error resilience regardless of the channel conditions having been measured by the channel conditions measurement section if a predetermined time period has elapsed without alteration of the error resilience.

Further, in order to achieve the above object, the communications method of the present invention is a communications method for transmitting stream data required to be transmitted in realtime, to an external communications device via a communications medium through packet communications, the communications method comprising: a channel conditions measurement step of measuring channel conditions in the communications medium; an error resilience adding step of adding error resilience to packets to be transmitted; and an error resilience managing step of controlling the error resilience added in the error resilience adding step, wherein: in the error resilience managing step, a transmission capacity of packets transmitted in a predetermined time period is calculated in accordance with the channel conditions having been measured in the channel conditions measurement step, and controls are performed in such a manner that (i) the error resilience is altered to a higher error resilience if the transmission capacity is below a threshold and that (ii) the error resilience is lowered regardless of the channel conditions having been measured in the channel conditions measurement step if a predetermined time period has elapsed without alteration of the error resilience.

In the above arrangement and method, a transmission capacity of packets transmitted in a predetermined time period is calculated in accordance with the channel conditions having been measured by the channel conditions measurement section. Here, the transmission capacity is, as described previously, the maximum number of packets transmittable under the channel conditions having been measured in a predetermined time period. Therefore, if the transmission capacity decreases, it is predicted that the channel conditions is deteriorated. In the above arrangement and method, if the calculated transmission capacity is not less than a threshold value, controls are performed to alter the error resilience to a higher one. On the other hand, if a predetermined time period has elapsed without alteration of the error resilience, controls are performed to lower the error resilience regardless of the channel conditions.

Thus, according to the above arrangement and method, the error resilience control is performed in accordance with the channel conditions having been measured by the communications device at the transmitting end. This eliminates the need for feedback from the communications device at the receiving end, and thus allows for promptly tracking variation of the communications environment. By performing control for higher error resilience by using decrease in transmission capacity as an index indicating deterioration of the channel conditions, it is possible to perform the control with the current channel conditions grasped accurately. Further, by performing control for lower error resilience regardless of the channel conditions if a predetermined time period has elapsed without alteration of the error resilience, a prompt tracking with respect to the recovery of the channel conditions is possible.

In addition to the above arrangement, the communications device of the present invention may be arranged so as to further include: an error resilience adding section which adds error resilience to packets to be transmitted; and an error resilience managing section which controls the error resilience added by the error resilience adding section, wherein: the error resilience managing section calculates a transmission capacity of packets transmitted in a predetermined time period in accordance with the channel conditions having been measured by the channel conditions measurement section, and performs controls so as to (i) alter the error resilience to a higher error resilience if the transmission capacity is below a threshold value and to (ii) lower the error resilience regardless of the channel conditions having been measured by the channel conditions measurement section if a predetermined time period has elapsed without alteration of the error resilience.

According to the above arrangement, not only the encoding rate of the stream data is determined, but also the error resilience granted to packets to be transmitted is altered, according to the transmission capacity of packets transmitted in a predetermined time period, calculated in accordance with the channel conditions having been measured by the channel conditions measurement section. Therefore, measurement of the channel conditions is performed without delay in the communications device at the transmitting end. In accordance with a result of the measurement, the encoding rate and the error resilience are altered. This makes it possible to perform the encoding rate control and the error resilience control each of which allows a prompt tracking with respect to variation of channel conditions, and thus allows further alleviation of video disturbance. As compared to the use of determination of the encoding rate and the error resilience control in isolation from each other, the amount of data required to be temporarily stored in the transmission buffer of the communications device can be reduced. This prevents increase in cost.

The communications device of the present invention is preferably arranged such that the channel conditions measurement section further measures a free bandwidth and an occupied bandwidth occupied by said communications device for a predetermined time period, and the encoding rate managing section and/or the error resilience managing section calculates the transmission capacity in accordance with the physical layer communications speed and information on the occupied bandwidth and the free bandwidth.

According to the above arrangement, the transmission capacity is calculated in accordance with information on the free bandwidth and the bandwidth occupied by the communications device for a predetermined time period as well as the physical layer communications speed. Therefore, it is possible to more accurately calculate the transmission capacity even in the best-effort types of communications.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A communications device which transmits stream data to an external communications device via a communications medium through packet communications,
the communications device comprising:
an encoding rate altering section which alters an encoding rate of the stream data;
an encoding rate managing section which controls alteration of the encoding rate;
a channel conditions measurement section which measures channel conditions in the communications medium;
an error resilience adding section which adds error resilience to packets to be transmitted; and
an error resilience managing section which controls the error resilience added by the error resilience adding section, wherein
the encoding rate managing section including an encoding rate determining section which determines the encoding rate in accordance with information on valid period of the stream data,
the information on valid period of the stream data is information on a time limit within which the stream data transmitted from the communications device should be reproduced at the external communications device, and
the error resilience managing section calculates a packet error rate of packets transmitted in a predetermined time period in accordance with the channel conditions having been measured by the channel conditions measurement section, and performs controls so as to (i) alter the error resilience to a higher error resilience if the packet error rate is not less than a threshold value and to (ii) lower the error resilience regardless of the channel conditions having been measured by the channel conditions measurement section if a predetermined time period has elapsed without alteration of the error resilience.

2. The communications device according to claim 1, wherein:
the encoding rate determining section determines the encoding rate in accordance with information on delay time until the encoding rate altering section actually alters the encoding rate after the encoding rate determining section instructs the encoding rate altering section to alter the encoding rate.

3. The communications device according to claim 1, further comprising:
a transmission buffer which temporarily stores data to be transmitted; and
a channel conditions measurement section which measures channel conditions in the communications medium,
the encoding rate managing section further including:
a transmission capacity calculating section which calculates a transmission capacity of packets transmitted in a predetermined time period, in accordance with the channel conditions having been measured by the channel conditions measurement section,
wherein:
the encoding rate determining section determines the encoding rate in accordance with the calculated transmission capacity and an amount of data stored in the transmission buffer, as well as the information on valid period of the stream data.

4. The communications device according to claim 3, wherein:
the encoding rate managing section calculates the transmission capacity in accordance with an amount of successfully transmitted data which is measured by the channel conditions measurement section.

5. The communications device according to claim 3, wherein:
the encoding rate determining section predicts that a future transmission capacity will be lower than the current transmission capacity at any time, and determines the encoding rate in accordance with the predicted future transmission capacity.

6. The communications device according to claim 3, wherein:
the encoding rate managing section further include a transmission capacity memory section which stores the transmission capacity calculated by the transmission capacity calculating section, and
the encoding rate determining section determines the encoding rate in accordance with past transmission capacities stored in the transmission capacity memory section and the amount of data stored in the transmission buffer.

7. The communications device according to claim 1, wherein:
the error resilience managing section calculates a current transmission capacity in accordance with the packet error rate having been measured by the channel conditions measuring section, compares between the current transmission capacity and a maximum transmission capacity that is transmittable at the higher error resilience, and then performs control for strengthening of the error resilience if the current transmission capacity is below the maximum transmission capacity at the higher error resilience.

8. The communications device according to claim 1, further comprising:
a communications section which serves as a physical layer in performing data transmission via the communications medium,
wherein:

the error resilience managing section controls the error resilience by altering a physical layer communications speed set by the physical layer of the communications section.

9. The communications device according to claim 1, wherein:
the error resilience managing section controls the error resilience by instructing the error resilience adding section to alter an encoding scheme and/or an encoding parameter of an error correcting code.

10. The communications device according to claim 1, wherein:
the encoding rate determining section sets the encoding rate to at least one of a maximum encoding rate and a minimum encoding rate.

11. The communications device according to claim 1, wherein:
the encoding rate altering section alters the encoding rate of the stream data to (a) an encoding rate determined by the encoding rate determining section or (b) an encoding rate that is nearest to the encoding rate (a) among a plurality of encoding rates for encoding of the same stream data.

12. A computer-readable medium having instructions stored thereon, said instructions are read and executed by a processor for causing the processor to function as each section of the communications device according to claim 1.

13. A communications system comprising:
the communications device according to claim 1; and
a receiving device which is capable of communications with said communications device via a communications medium, and receives stream data from said communications device.

14. A communications device which transmits stream data to an external communications device via a communications medium through packet communications,
the communications device comprising:
an encoding rate altering section which alters an encoding rate of the stream data;
an encoding rate managing section which controls alteration of the encoding rate,
the encoding rate managing section including an encoding rate determining section which determines the encoding rate in accordance with information on delay time until the encoding rate altering section actually alters the encoding rate after the encoding rate determining section instructs the encoding rate altering section to alter the encoding rate, the delay time until the encoding rate is actually altered is a time based on a period during which the encoding rate altering section cannot alter the encoding rate;
a channel conditions measurement section which measures channel conditions in the communications medium;
an error resilience adding section which adds error resilience to packets to be transmitted; and
an error resilience managing section which controls the error resilience added by the error resilience adding section,
wherein:
the error resilience managing section calculates a packet error rate of packets transmitted in a predetermined time period in accordance with the channel conditions having been measured by the channel conditions measurement section, and performs controls so as to (i) alter the error resilience to a higher error resilience if the packet error rate is not less than a threshold value and to (ii) lower the error resilience regardless of the channel conditions having been measured by the channel conditions measurement section if a predetermined time period has elapsed without alteration of the error resilience.

15. The communications device according to claim 14, further comprising:
a transmission buffer which temporarily stores data to be transmitted; and
a channel conditions measurement section which measures channel conditions in a communications medium,
the encoding rate managing section further including:
a transmission capacity calculating section which calculates a transmission capacity of packets transmitted in a predetermined time period, in accordance with the channel conditions having been measured by the channel conditions measurement section,
wherein:
the encoding rate determining section determines the encoding rate in accordance with the calculated transmission capacity and an amount of data stored in the transmission buffer, as well as the information on delay time.

16. The communications device according to claim 15, wherein:
the encoding rate determining section predicts that a future transmission capacity will be lower than the current transmission capacity at any time, and determines the encoding rate in accordance with the predicted future transmission capacity.

17. The communications device according to claim 15, wherein:
the encoding rate managing section further include a transmission capacity memory section which stores the transmission capacity calculated by the transmission capacity calculating section, and
the encoding rate determining section determines the encoding rate in accordance with past transmission capacities stored in the transmission capacity memory section and the amount of data stored in the transmission buffer.

18. The communications device according to claim 15, wherein:
the encoding rate managing section calculates the transmission capacity in accordance with an amount of successfully transmitted data which is measured by the channel conditions measurement section.

19. The communications device according to claim 14, wherein:
the error resilience managing section calculates a current transmission capacity in accordance with the packet error rate having been measured by the channel conditions measuring section, compares between the current transmission capacity and a maximum transmission capacity that is transmittable at the higher error resilience, and then performs control for strengthening of the error resilience if the current transmission capacity is below the maximum transmission capacity at the higher error resilience.

20. The communications device according to claim 14, further comprising:
a communications section which serves as a physical layer in performing data transmission via the communications medium,
wherein:
the error resilience managing section controls the error resilience by altering a physical layer communications speed set by the physical layer of the communications section.

21. The communications device according to claim 14, wherein:
the error resilience managing section controls the error resilience by instructing the error resilience adding section to alter an encoding scheme and/or an encoding parameter of an error correcting code.

22. The communications device according to claim 14, wherein:
the encoding rate determining section sets the encoding rate to at least one of a maximum encoding rate and a minimum encoding rate.

23. The communications device according to claim 14, wherein:
the encoding rate altering section alters the encoding rate of the stream data to (a) an encoding rate determined by the encoding rate determining section or (b) an encoding rate that is nearest to the encoding rate (a) among a plurality of encoding rates for encoding of the same stream data.

24. A communications device which performs packet communications to an external communications device via a communications medium,
the communications device comprising:
a channel conditions measurement section which measures, at a transmitting end of the communications device, channel conditions in the communications medium;
an error resilience adding section which adds error resilience to packets to be transmitted;
an error resilience managing section which controls the error resilience added by the error resilience adding section;
a communications section which serves as a physical layer in performing data transmission via the communications medium;
the channel conditions measurement section measures a physical layer communications speed and a packet error rate, the physical layer communications speed being set by the physical layer of the communications section; and
an encoding rate managing section and/or the error resilience managing section calculates the transmission capacity in accordance with the physical layer communications speed and the packet error rate both of which are measured by the channel conditions measurement section,
wherein:
the error resilience managing section calculates the packet error rate of packets transmitted in a predetermined time period in accordance with the channel conditions having been measured by the channel conditions measurement section, and performs controls so as to (i) alter the error resilience to a higher error resilience if the packet error rate is not less than a threshold value and to (ii) lower the error resilience regardless of the channel conditions having been measured by the channel conditions measurement section if a predetermined time period has elapsed without alteration of the error resilience.

25. The communications device according to claim 24, further comprising:
a table memory section which stores a table representing a relationship between the physical layer communications speed and a maximum transmission capacity that is transmittable within a predetermined time period,
wherein:
the encoding rate managing section and/or the error resilience managing section acquires a maximum transmission capacity, from the table, corresponding to the physical layer communications speed having been measured by the channel conditions measurement section, and then calculates the transmission capacity in accordance with the acquired maximum transmission capacity and the packet error rate having been measured by the channel conditions measurement section.

26. The communications device according to claim 25, wherein:
the channel conditions measurement section further measures a communications bandwidth allocated to said communications device for a predetermined time period, and
the encoding rate managing section and/or the error resilience managing section calculates the transmission capacity in accordance with information on the physical layer communications speed and the communications bandwidth.

27. The communications device according to claim 25, wherein:
the channel conditions measurement section further measures a free bandwidth and an occupied bandwidth occupied by said communications device for a predetermined time period, and
the encoding rate managing section and/or the error resilience managing section calculates the transmission capacity in accordance with the physical layer communications speed and information on the free bandwidth and the occupied bandwidth.

28. The communications device according to claim 24, wherein:
the error resilience managing section calculates a current transmission capacity in accordance with the packet error rate having been measured by the channel conditions measuring section, compares between the current transmission capacity and a maximum transmission capacity that is transmittable at the higher error resilience, and then performs control for strengthening of the error resilience if the current transmission capacity is below the maximum transmission capacity at the higher error resilience.

29. The communications device according to claim 24, further comprising:
a communications section which serves as a physical layer in performing data transmission via the communications medium,
wherein:
the error resilience managing section controls the error resilience by altering a physical layer communications speed set by the physical layer of the communications section.

30. The communications device according to claim 24, wherein:
the error resilience managing section controls the error resilience by instructing the error resilience adding section to alter an encoding scheme and/or an encoding parameter of an error correcting code.

31. A communications device which transmits stream data to an external receiving device via a plurality of relay stations through packet communications,
the communications device comprising:
an encoding rate altering section which alters an encoding rate of the stream data; and
an encoding rate managing section which controls alteration of the encoding rate,
wherein:
the encoding rate managing section compares between a total amount of data transmitted from said communications device and a total amount of data received by the receiving device so as to predict amounts of data stored in the transmission buffer of said communications device and transmission buffers of the respective relay stations, and determines the encoding rate in accordance with the predicted amounts of stored data and the total amount of data received by the receiving device.

32. A communications method for transmitting stream data to an external communications device via a communications medium through packet communications, the communications method comprising:
altering an encoding rate of the stream data;
controlling alteration of the encoding rate;
measuring channel conditions in the communications medium;
adding error resilience to packets to be transmitted;
controlling the error resilience added; and
calculating a packet error rate of packets transmitted in a predetermined time period in accordance with the measured channel conditions, and performing controls so as to (i) alter the error resilience to a higher error resilience if the packet error rate is not less than a threshold value and to (ii) lower the error resilience regardless of the measured channel conditions if a predetermined time period has elapsed without alteration of the error resilience,
wherein the encoding rate is determined in accordance with information on valid period of the stream data, and
the information on valid period of the stream data is information on a time limit within which the stream data transmitted from the communications device should be reproduced at the external communications device.

33. A communications method for transmitting stream data to an external communications device via a communications medium through packet communications, the communications method comprising:
altering an encoding rate of the stream data; and
controlling alteration of the encoding rate,
wherein the encoding rate is determined in accordance with information on delay time until the encoding rate is actually altered after a receipt of encoding rate alteration instruction, the delay time until the encoding rate is actually altered is a time based on a period during which the encoding rate cannot be altered;
measuring channel conditions in the communications medium;
adding error resilience to packets to be transmitted;
controlling the added error resilience;
calculating a packet error rate of packets transmitted in a predetermined time period in accordance with the measured channel conditions; and
performing controls so as to (i) alter the error resilience to a higher error resilience if the packet error rate is not less than a threshold value and to (ii) lower the error resilience regardless of the measured channel conditions if a predetermined time period has elapsed without alteration of the error resilience.

34. A communications method for performing packet communications with respect to an external communications device via a communications medium, where a communications section serves as a physical layer in performing data transmission via the communications medium, the communications method comprising:
measuring channel conditions in the communications medium at a transmitting end of a communications device;
adding error resilience to packets to be transmitted;
controlling the error resilience added; and
measuring a physical layer communications speed and a packet error rate, the physical layer communications speed being set by the physical layer of the communications section, and
calculating the transmission capacity in accordance with the physical layer communications speed and the packet error rate,
wherein the packet error rate of packets transmitted in a predetermined time period is calculated in accordance with the channel conditions having been measured, and controls are performed in such a manner that (i) the error resilience is altered to a higher error resilience if the packet error rate is not less than a threshold value and that (ii) the error resilience is lowered regardless of the channel conditions having been measured if a predetermined time period has elapsed without alteration of the error resilience.

35. A communications method for transmitting stream data from a communications device to an external receiving device via a plurality of relay stations through packet communications, the communications method comprising:
altering an encoding rate of the stream data; and
controlling alteration of the encoding rate,
wherein comparison is performed between a total amount of data transmitted from the communications device and a total amount of data received by the receiving device so as to predict amounts of data stored in the transmission buffer of said communications device and transmission buffers of the respective relay stations, and the encoding rate is determined in accordance with the predicted amounts of stored data and the total amount of data received by the receiving device.

36. A computer-readable medium having instructions stored thereon, said instructions are read and executed by a processor for causing the processor to perform the communications method according to claim 35.

* * * * *